(12) United States Patent
Kim et al.

(10) Patent No.: US 10,182,094 B2
(45) Date of Patent: Jan. 15, 2019

(54) METHOD AND APPARATUS FOR TRANSMITTING AND RECEIVING DATA

(71) Applicant: Samsung Electronics Co., Ltd., Gyeonggi-do (KR)

(72) Inventors: Geonsoo Kim, Gyeonggi-do (KR); Yongjoon Jeon, Gyeonggi-do (KR); Hyunsoo Kim, Gyeonggi-do (KR); Donghyun Yeom, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 73 days.

(21) Appl. No.: 14/992,461

(22) Filed: Jan. 11, 2016

(65) Prior Publication Data

US 2016/0212190 A1 Jul. 21, 2016

(30) Foreign Application Priority Data

Jan. 19, 2015 (KR) ........................ 10-2015-0008528

(51) Int. Cl.
*H04L 29/06* (2006.01)
*G06F 3/0488* (2013.01)
*G11B 27/10* (2006.01)

(52) U.S. Cl.
CPC .......... *H04L 65/602* (2013.01); *G11B 27/102* (2013.01); *H04L 65/4084* (2013.01); *G06F 3/04883* (2013.01); *G06F 2203/04806* (2013.01)

(58) Field of Classification Search
CPC ........... H04N 21/4223; H04N 21/8586; H04N 21/23439; H04N 21/8352; H04N 21/4786;
(Continued)

(56) References Cited

U.S. PATENT DOCUMENTS 5,924,071 A * 7/1999 Morgan ................. G11B 27/34 369/126
8,259,816 B2 * 9/2012 Coleman, Sr. ......... H04N 7/181 375/240.26
(Continued)

FOREIGN PATENT DOCUMENTS

KR 10-2006-0038361 A 5/2006
KR 10-0780061 B1 11/2007
(Continued)

*Primary Examiner* — Patrice L Winder
*Assistant Examiner* — Abderrahmen Chouat
(74) *Attorney, Agent, or Firm* — Cha & Reiter, LLC

(57) ABSTRACT

A method and apparatus for transmitting/receiving multimedia data in the form of divided data segments. The data transmission method of the present disclosure includes detecting a multimedia data transmission request, segmenting multimedia data into data segments according to a predetermined condition in response to the multimedia data transmission request, and transmitting the data segments selectively or as a whole. By detecting of a gesture on or above a preview image, a plurality of segments can be displayed. In the case of hovering (proximity input) as the detected signal strength changes quantity with a distance of the proximity input, the quantity of preview images displayed may increase or decrease. In an embodiment, the gesture to view more segments may be a pinch-to-zoom gesture. The electronic device is constructed for operation of the methods disclosed herein.

18 Claims, 22 Drawing Sheets

(58) Field of Classification Search
CPC ........... H04N 21/2743; H04N 21/2747; H04N 21/4782; H04N 21/6379; H04N 7/17336; H04N 7/183; H04N 2005/2255; H04N 21/4788; H04N 21/812; H04N 21/8456; H04L 65/602; H04L 65/4084; H04L 65/80; H04L 67/2823; H04L 67/10; H04L 67/1095; H04L 41/0816; H04L 47/70; H04L 47/78; H04L 63/0853; H04L 67/06; H04L 67/1097; H04L 67/22; H04L 67/306; H04L 69/04; H04L 63/102; H04L 65/40; H04L 65/403; H04L 65/60; H04L 67/04; H04L 67/2828; H04M 3/567; H04M 7/0039; G06F 19/00; G06F 19/30; G06F 3/023; G06F 3/0334; G06F 3/0481; G06F 3/04842; G06F 3/04883; G06F 2203/04806; G11B 27/102

See application file for complete search history.

(56) References Cited

U.S. PATENT DOCUMENTS

| | | | |
|---|---|---|---|
| 2006/0179153 | A1 | 8/2006 | Lee et al. |
| 2009/0193101 | A1* | 7/2009 | Munetsugu .......... G11B 27/034 709/219 |
| 2009/0254960 | A1* | 10/2009 | Yarom ............... G06F 17/30781 725/115 |
| 2011/0074824 | A1* | 3/2011 | Srinivasan .......... G06F 3/04883 345/660 |
| 2011/0082943 | A1* | 4/2011 | Ha ....................... H04N 21/236 709/231 |
| 2012/0259957 | A1* | 10/2012 | Keum ................ H04L 65/4084 709/219 |
| 2013/0179796 | A1* | 7/2013 | BianRosa ............ G06F 3/0488 715/740 |
| 2014/0101292 | A1* | 4/2014 | Eriksson ............... H04L 65/602 709/219 |
| 2014/0281988 | A1* | 9/2014 | Watts ..................... G06F 3/017 715/716 |
| 2014/0362119 | A1* | 12/2014 | Freund .................... G06F 3/017 345/661 |
| 2015/0249710 | A1* | 9/2015 | Stefansson ............. G06F 21/10 709/217 |
| 2015/0256763 | A1* | 9/2015 | Niemi ................... G06F 3/0485 348/700 |

FOREIGN PATENT DOCUMENTS

| | | |
|---|---|---|
| KR | 10-2011-0049393 A | 5/2011 |
| KR | 10-2013-0037315 A | 4/2013 |
| WO | 2008/082190 A1 | 7/2008 |

* cited by examiner

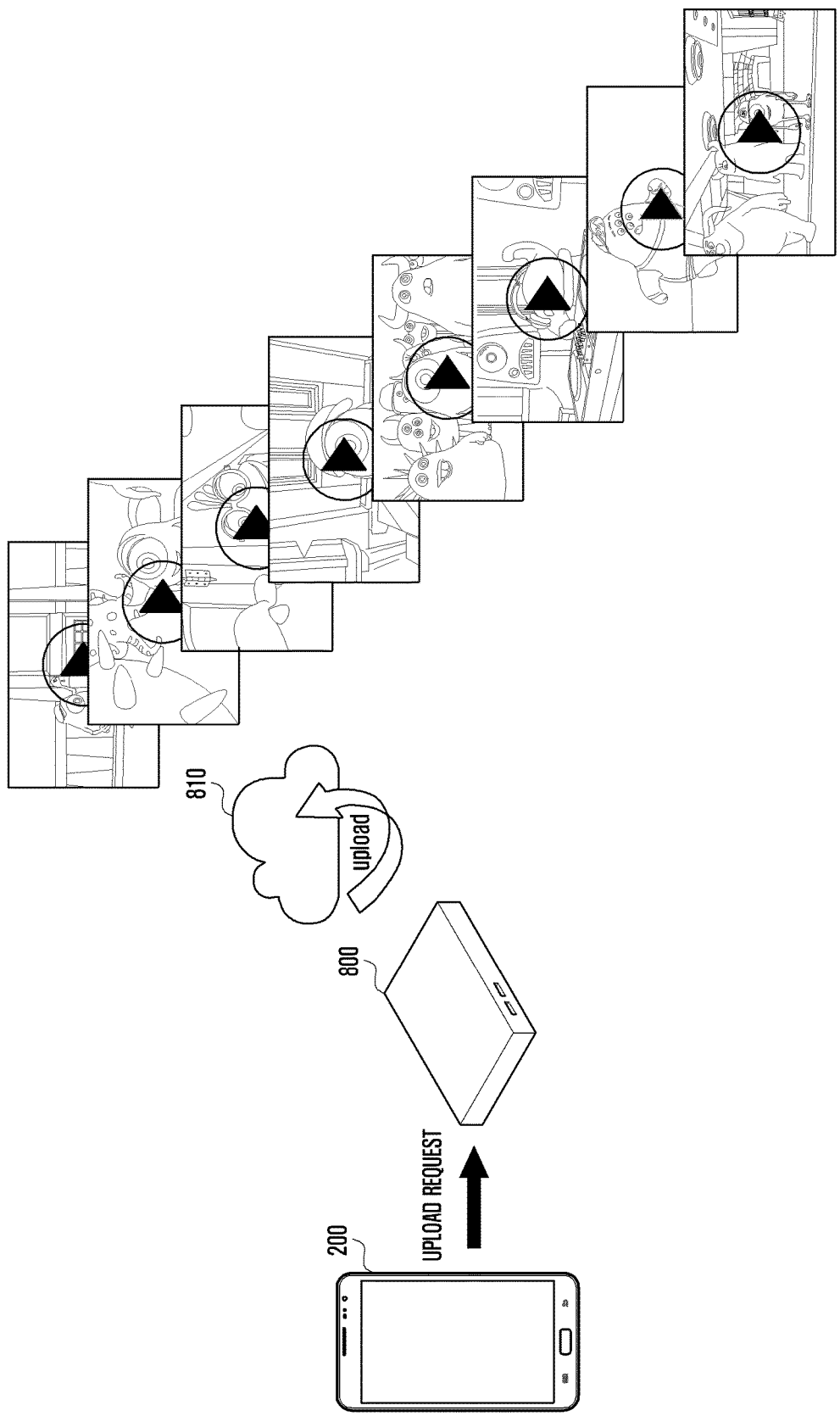

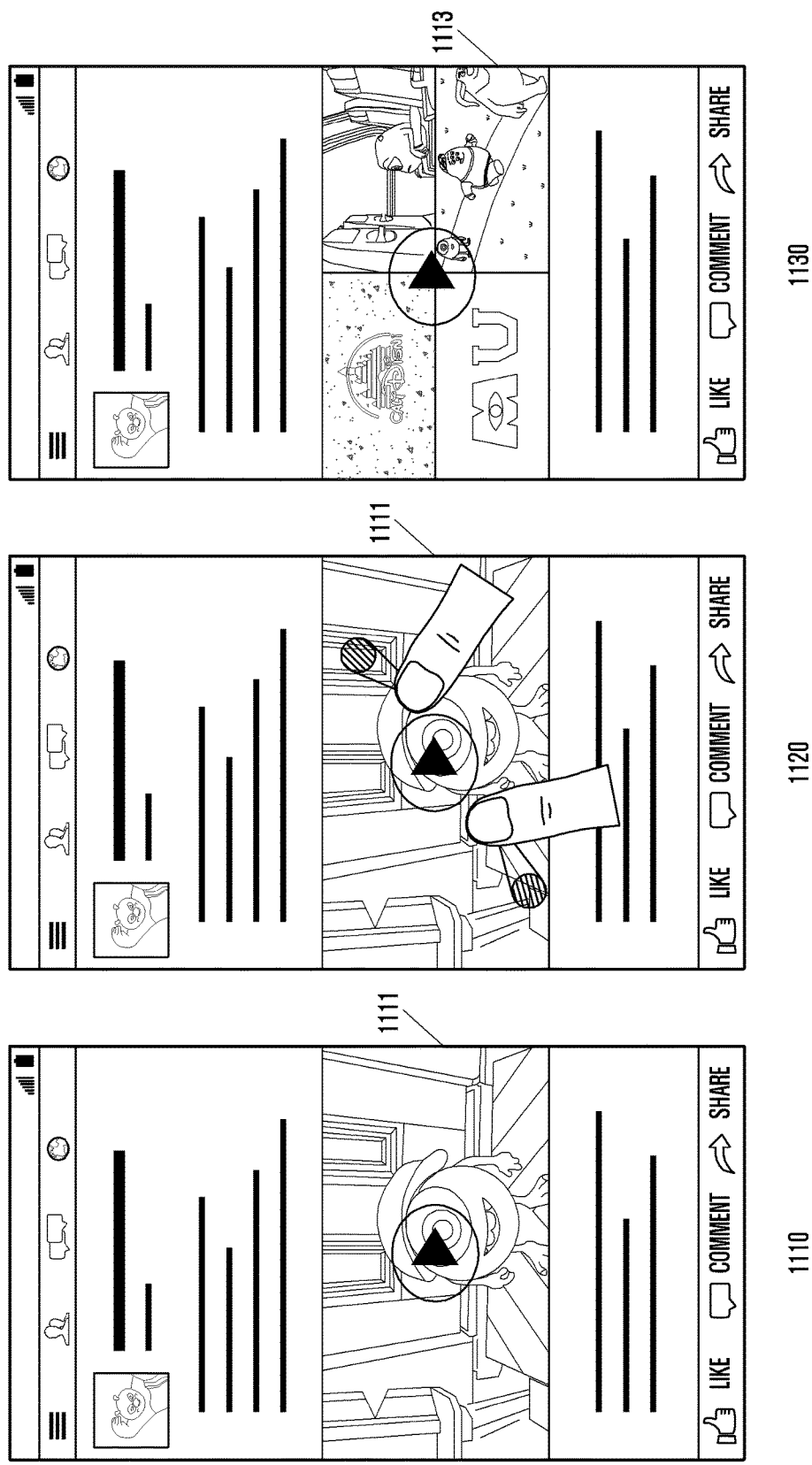

FIG. 11B
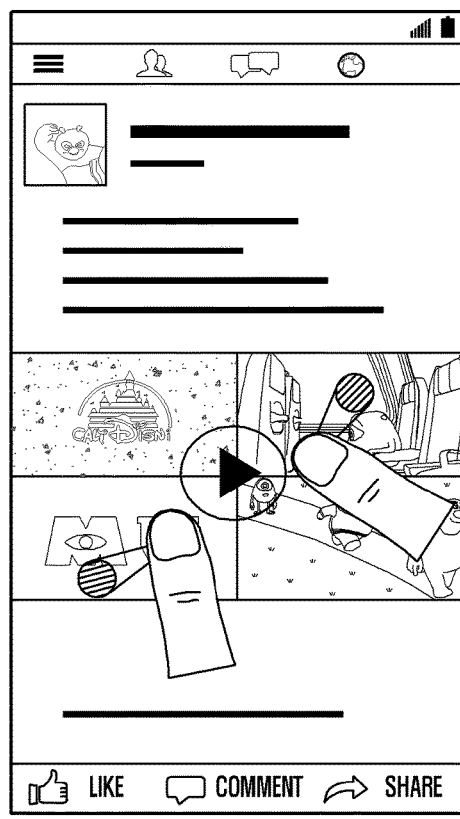
1140
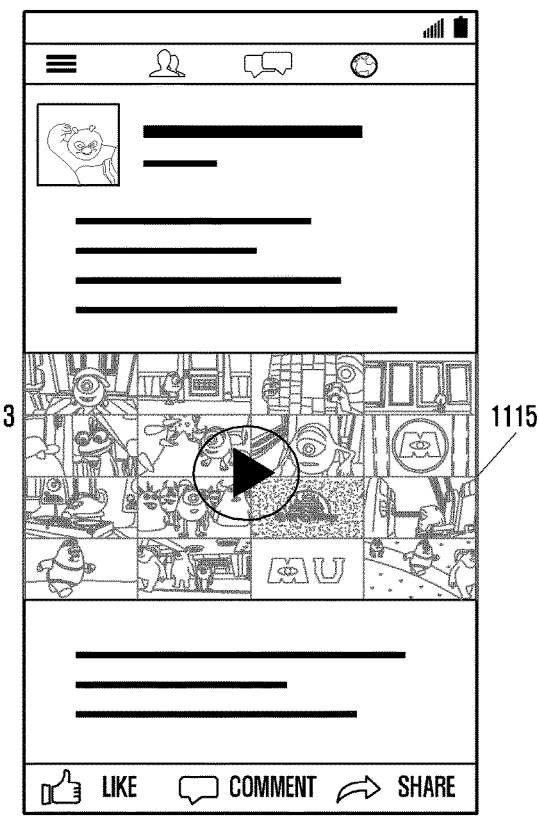
1150

FIG. 12A
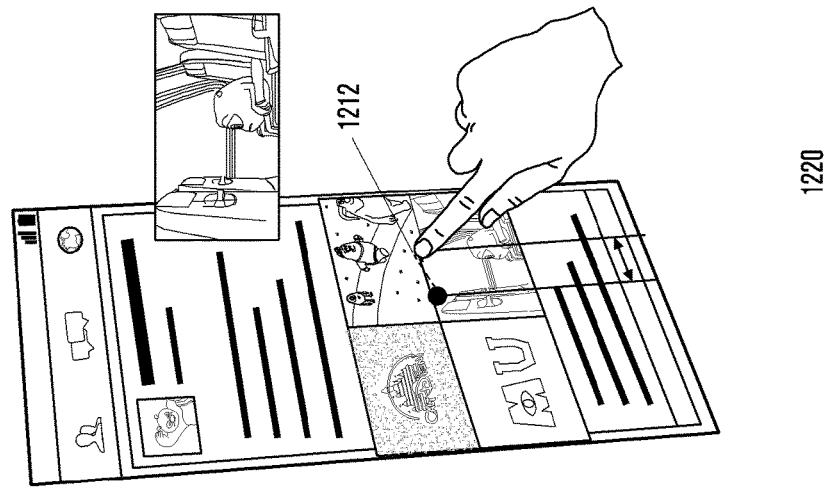
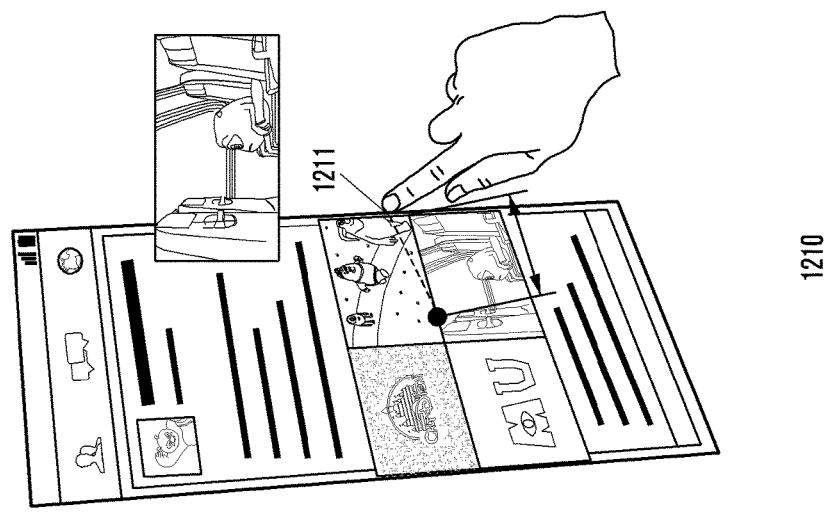

METHOD AND APPARATUS FOR TRANSMITTING AND RECEIVING DATA

CLAIM OF PRIORITY

This application claims the benefit of priority under 35 U.S.C. § 119(a) from a Korean patent application filed on Jan. 19, 2015, in the Korean Intellectual Property Office and assigned Serial No. 10-2015-0008528, the entire disclosure of which is hereby incorporated by reference.

BACKGROUND

Field of the Disclosure

The present disclosure relates to a method and apparatus for transmitting/receiving segmented data.

Description of the Related Art

The use of mobile multimedia data such as motion picture data is increasing. Such multimedia data can be exchanged between wireless communication-enabled devices. With the advance of wireless communication technologies and increased of storage capacity in mobile devices, it has become possible for the users to upload the multimedia data on a public webpage with their mobile devices, the uploaded multimedia data then being downloaded and played typically by other mobile devices. In this manner, the multimedia data can be exchanged between devices and uploaded to and downloaded or streamed from an Internet server so as to be accessed for various purposes.

The multimedia data transmission/reception (including upload and download) includes uploading and downloading files. Thus, in order to play a certain video on a webpage, the user has to determine the content of the video based on a preview image presented on the screen. The preview image may not be representative of the entire video if there are a number of different scenes with different characters or actions. The legacy type information on a video is not detailed enough to make an accurate determination about the video content, such that the user often has to play many videos one-by-one to find an intended one, resulting in a waste of data communication costs and time.

Also, since the video contents are transmitted as minimum by the file, it is impossible to transmit/receive only a selective part of a file. Thus, even when one desires just a part of a certain video for viewing, the user has to receive the entire file, resulting in an unnecessary waste of time and cost.

SUMMARY

In accordance with an aspect of the present disclosure, a data transmission method is provided that is heretofore unknown. The data transmission method includes detecting a multimedia data transmission request, segmenting multimedia data into a plurality of data segments according to a predetermined condition in response to the multimedia data transmission request, and transmitting the data segments selectively or as a whole.

In accordance with another aspect of the present disclosure, a data reception method is provided. The data reception method includes displaying multimedia data composed of a plurality of data segments, detecting a multimedia data reception request for the displayed multimedia data, and receiving the data segments selectively or as a whole in response to the multimedia data reception request.

In accordance with still another aspect of the present disclosure, an electronic device is provided. The electronic device includes a storage unit comprising a non-transitory memory which stores a plurality of data segments constituting multimedia data, a controller which controls segmenting the multimedia data into the data segments and controls the electronic device to transmit and receive the data segments selectively or as a whole, and a communication unit including hardware such as a transceiver which transmits and receives the data segments.

BRIEF DESCRIPTION OF THE DRAWINGS

FIG. 8B illustrates that a first electronic device makes a request to the second electronic device for a video upload;

FIG. 11A and FIG. 11B are diagrams illustrating screen displays illustrating the procedure of providing additional information of multimedia according to an embodiment of the present disclosure;

FIG. 12A and FIG. 12B are diagrams illustrating a method of requesting for additional information of multimedia data with a proximity input according to an embodiment of the present disclosure;

DETAILED DESCRIPTION

Figure 1:
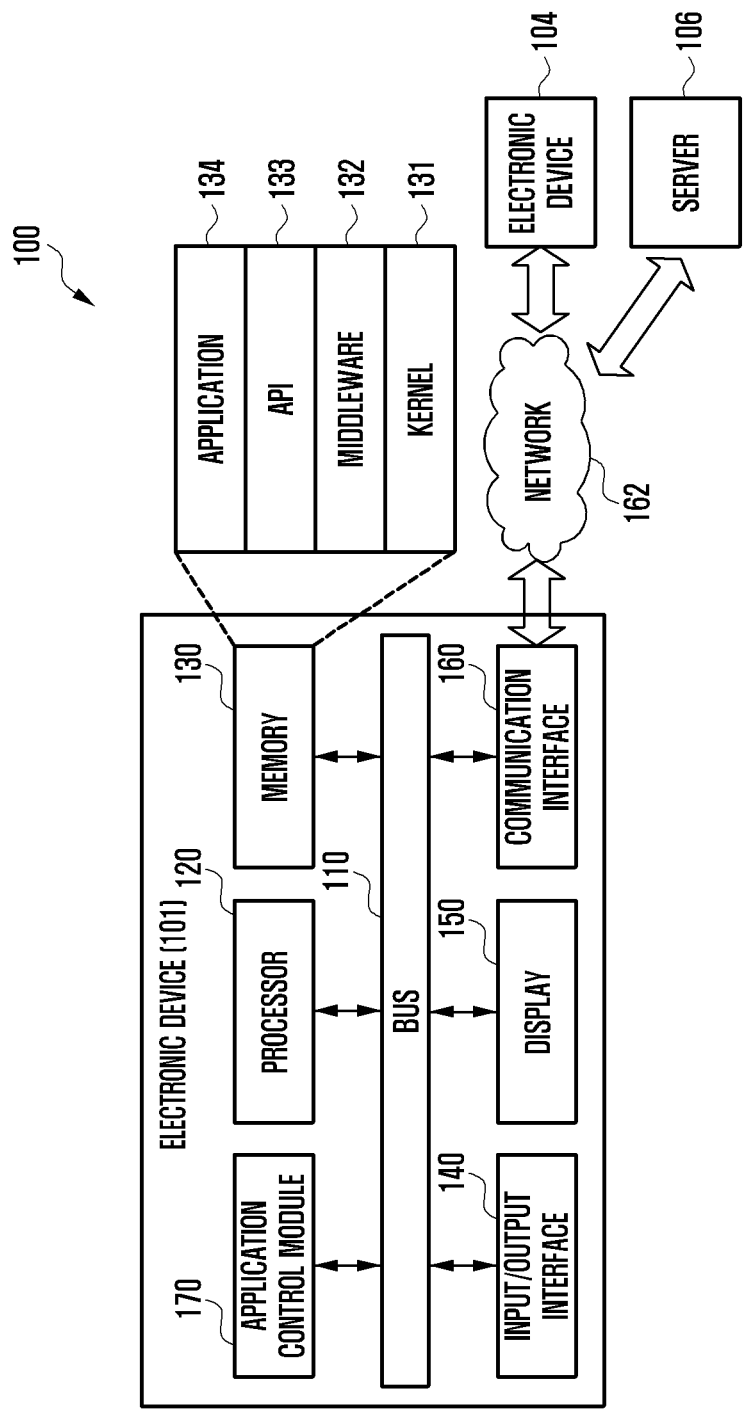
FIG. 1 is a diagram illustrating a network environment including an electronic device according to an embodiment of the present disclosure.

Hereinafter, the present disclosure will be described with reference to the accompanying drawings. The present disclosure may have various embodiments, and modifications and changes may be made therein that are within the scope of the appended claims. Therefore, the present disclosure will be described in conjunction with particular embodiments shown in the accompanying drawings.

However, it should be understood that the present disclosure is not limited to the particular embodiments shown and described herein, but includes all modifications, equivalents, and/or alternatives within the spirit and scope of the present disclosure. In describing the drawings, similar reference numerals are used to designate similar elements. It should also be understood that for written description purposes, elements of one embodiment may be combined with elements from another embodiment (or embodiments) unless specified to the contrary.

In the present disclosure, the expression "include" or "may include" refers to existence of a corresponding function, operation, or element, and does not limit one or more additional functions, operations, or elements. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element may be directly connected or accessed to the other elements, but also another element may exist between them. Contrarily, when an element is referred to as being "directly coupled" or "directly connected" to any other element, it should be understood that no element is interposed therebetween.

In the present disclosure, the terms are used to describe specific embodiments, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present disclosure may be an electronic device including a display. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, a person of skill in the art will appreciate that the electronic device according to the present disclosure is not limited to the aforementioned devices.

Hereinafter, an electronic device according to various embodiments will be described with reference to the accompanying drawings. The term "user" as described in various embodiments may refer to a person who uses an electronic device or a device (for example, an artificial intelligence electronic device) that uses an electronic device.

FIG. 1 is a block diagram illustrating a network environment 100 including therein an electronic device 101 in accordance with an embodiment of the present disclosure. Referring now to FIG. 1, the electronic device 101 may include, but not limited to, a bus 110, a processor 120, a non-transitory memory 130, an input/output interface 140, a display 150, a communication interface 160, and a data segmentation module 170.

The bus 110 may be a circuit designed for connecting the above-discussed elements and communicating data (e.g., a control message) between such elements.

The processor 120, which comprises hardware circuitry configured for operation, may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

The memory 130 may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using techniques such as assigning the priority for using a system resource of the electronic device 101 (e.g., the bus 110, the processor 120, or the memory 130, etc.) to at least one of the applications 134.

The API 133, which is an interface for allowing the application 134 to control a function provided by the kernel 131 or the middleware 132, may include, for example, at least one interface or function (e.g., a command) for a file control, a window control, an image processing, a text control, and the like.

According to various embodiments of the disclosure, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to various embodiments of the disclosure, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may perform a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The data segmentation module 170 segments the data from other components (e.g. memory 130, and communication interface 160). For example, if a data transmission request is detected by the processor 120 or separately, the data segmentation module 170 may segment the corresponding data according to a predetermined number or amount. The data segmentation module 170 may provide the segmented data of, for example, a file, in order for users to select part of the data of the file without having to receive the entire file and sift through it for the desired portion.

Figure 2:
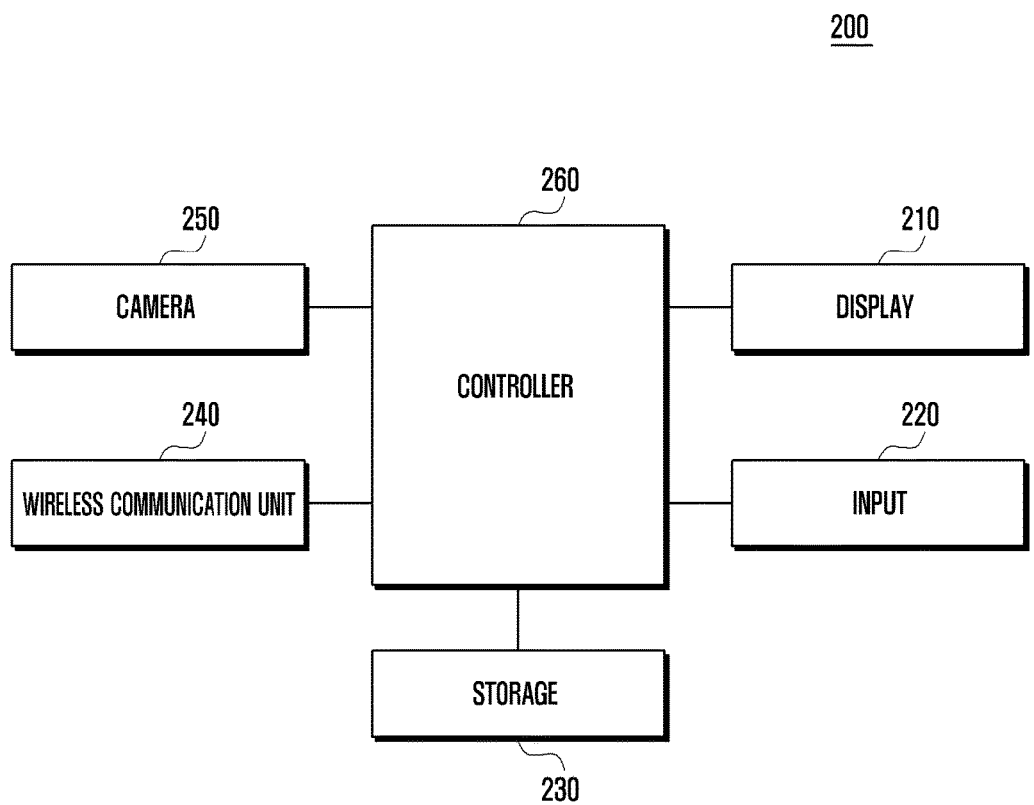
FIG. 2 is a block diagram illustrating a configuration of the electronic device according to an embodiment of the present disclosure.

FIG. 2 is a block diagram illustrating a configuration of the electronic device according to an embodiment of the present disclosure.

The electronic device according to an embodiment of the present disclosure includes a display unit 210 (e.g., display 150), an input unit 220 (e.g., input/output interface 140), a storage 230 (e.g., memory 130), a wireless communication unit 240 (e.g., wireless communication interface 160), a camera 250, and a controller 260 (e.g., processor 120).

The display unit 210 comprises hardware, and may be implemented with one of Liquid Crystal Display (LCD), Organic Light Emitting Diodes (OLED), Active Matrix Light Emitting Diodes (AMOLED), and it may present a menu, user input data, and function setting information to the user.

The display unit 210 according to an embodiment of the present disclosure may display a list of multimedia data generated by and stored in the electronic device 200. The display unit 210 may display the data to be transmitted to or to receive from another electronic device or server in the form of a list with preview images thereof. For reference, a preview image is the image presented for identifying the corresponding data, e.g. one of the frames constituting the corresponding data. Also, the preview image may be data generated in a format which changes at least one of properties of the raw data to improve loading speed.

Furthermore, when the multimedia data provided on a webpage are played, the display unit 210 may display the playback scenes of the corresponding data on the screen.

The input unit 220 includes hardware that may receive various types of user input such as touch, near touch and keystroke inputs for controlling operations of the electronic device 200. The input unit 220 according to an embodiment of the present disclosure may receive the user input (e.g. touch or keystroke input) made for transmitting multimedia data from the electronic device 200 to another electronic device. The input unit 220 may also detect a proximity input (e.g., hovering gesture input) made by the user to make a request for a preview of segmented data. For example, if a proximity input is detected at a position on a representative image of certain segmented data, the input unit 220 may make a request to the controller 260 for preview function which displays some images of the segmented data in the form of animation.

The storage 230 is responsible for storing programs and data for operation of the electronic device. According to an embodiment of the present disclosure, the storage 230 comprises a non-transitory memory that may store the multimedia data produced by the electronic device 200 or downloaded multimedia data. According to an embodiment of the present disclosure, when a data segment of the multimedia data is received from a server or another electronic device, the storage 230 may store the first frame of each data segment as the representative image thereof. Each of the representative images may be composed of 4 or 16 images and stored in the storage 230. The storage 230 may also store a program that when executed will segment the multimedia data to be transmitted into a plurality of segments. The storage 230 may also store various programs that can be executed to perform other functions (e.g. a function of playing a preview image of the data segment to which a hovering gesture is made and a function of notifying the presence of data segments that are not uploaded).

The wireless communication unit 240 comprises hardware such as a transmitter, receiver, and or transceiver, one or more antennas, etc., and is responsible for wireless communication functions of the mobile terminal utilizing one or more protocols. The wireless communication unit 240 may include a Radio Frequency (RF) transmitter for up-converting and amplifying the signal to be transmitted and an RF receiver for low-noise-amplifying and down-converting the received signal. The wireless communication unit 240 may also include a cellular communication module such as Long Term Evolution (LTE) and Code Division Multiple Access (CDMA) modules, a digital broadcast module such as Digital Multimedia Broadcasting (DMB) and Digital Video Broadcasting (DVB) modules, an Internet communication module such as Wireless-Fidelity (Wi-Fi) and Wireless Broadband (WiBro), and a short range communication module such as Near Field Communication (NFC) and Bluetooth modules.

According to an embodiment of the present disclosure, the wireless communication unit 240 may send data segments to another electronic device or server under the control of the controller 260 in response to a multimedia data transmission request. The wireless communication unit 240 may receive the video data which the server or another electronic device provides in response to a download request (e.g. streaming playback).

According to an embodiment of the present disclosure, the camera 250 is responsible for taking a video to generate multimedia data. According to various embodiments of the disclosure, the camera 250 may take a video and generate video data in the form of data segments based on the capacity and capability of the electronic device 200.

The controller 260, which comprises hardware circuitry configured for operations such as, for example, at least one a processor or microprocessor may control overall operation of the electronic device and signal flows among the components of the electronic device. According to an embodiment of the present disclosure, when the electronic device 200 transmits data to another electronic device or a server, the controller 260 may control the segmenting of the video data and transmit the data segments based on a predetermined condition. The controller 260 may also control the transmission of some of the data segments according to the user's selection. The controller 260 may also control such that the electronic device transmits to another electronic the data segments of the multimedia data that may be required to execute the output of content, with exception of the data segments that are may not be needed to execute content (e.g. content can be accessed, viewed, etc. regardless of the presence of such data segments.) by another electronic device or by a server. At this time, the controller 260 may determine the data segments including neither any image nor sound may not be needed to when accessing multimedia content.

In the case where the multimedia data to be transmitted are segmented (e.g. data segments produced by a low-capacity electronic device), the controller 260 may determine whether the data size of each data segment of the multimedia data is equal to or less than a minimum segment size (i.e. a predetermined minimum size of data segment, e.g. 5 MB). If the data segment size is equal to or less than the minimum segment size, the controller 260 may combine a plurality of successive data segments until the minimum size is reached. The number of data segments to be combined and combination criteria may change according to the type of multimedia data and capacity of the electronic device. The controller 260 may control the data segment combination operations in order to reduce the degree of segmentation such that smaller numbers of data segments are transmitted to another electronic device or server, as compared to initially-determined number of data segments.

The controller 260 may receive data segments from the server or another electronic device. Here, the data reception is an operation including streaming playback. The controller 260 may control the electronic device to receive additional information as well as basic information on the multimedia data (e.g. preview image). The controller 260 may detect a pinch-to-zoom or proximity gesture (e.g. hovering gesture) which is made to request for additional information. For example, if the pinch-to-zoom gesture is detected on a preview image of the multimedia data, the controller 260 may control the electronic device to receive additional preview images. Also, if a proximity gesture is detected on the preview image of the multimedia data, the controller 260 may control the electronic device to display a preview animation of the corresponding data. The preview animation may be implemented by displaying several sequential images constituting the data.

The controller 260 may also determine whether to receive data segments or whole multimedia data based on the position of the preview image selected on the timeline of the multimedia data. If one of the preview images presented on the timeline of the multimedia is selected by means of a proximity gesture or touch gesture, the controller 260 may control the electronic device to receive the corresponding data segment or the additional data on the corresponding data segment.

Figure 3:
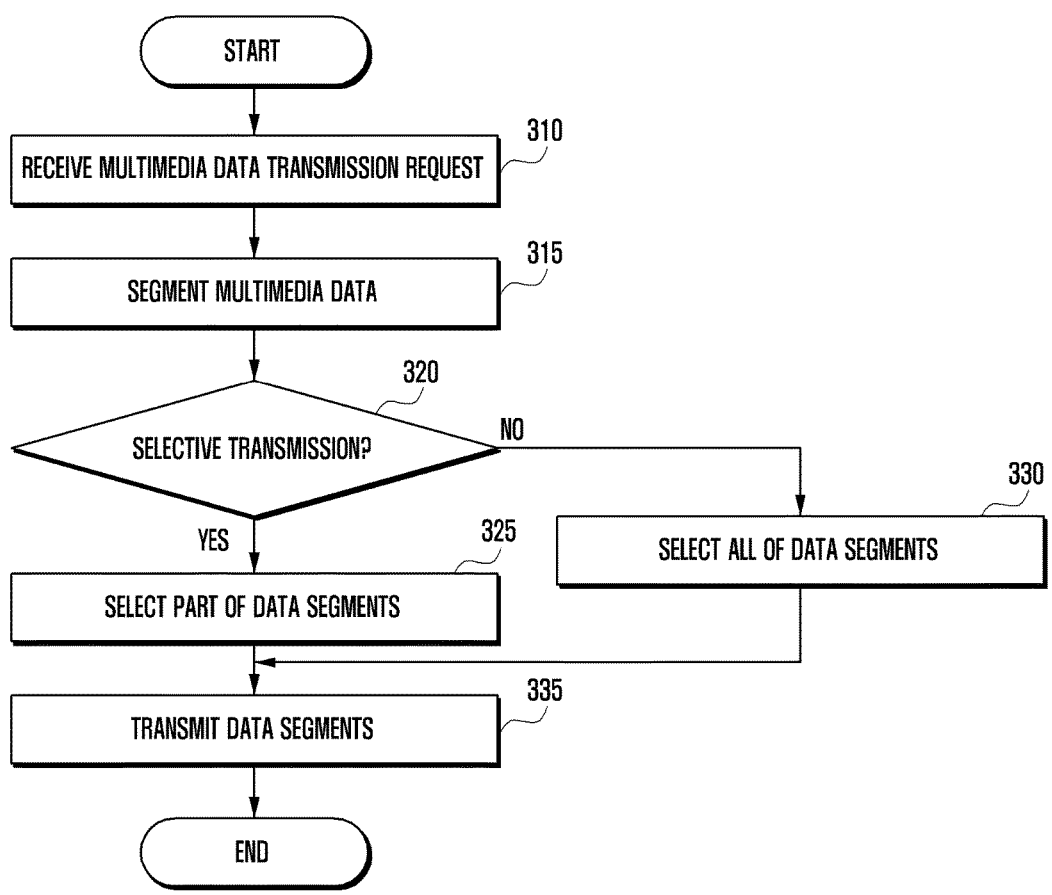
FIG. 3 is a flowchart illustrating an operation of a segmented multimedia data transmission procedure of the electronic device according to an embodiment of the present disclosure.

FIG. 3 is a flowchart illustrating a segmented multimedia data transmission procedure of the electronic device according to an embodiment of the present disclosure.

In the multimedia transmission procedure of FIG. 3, the controller 260 detects a multimedia data transmission request at step 310. The multimedia data transmission request may include a request for upload of multimedia data to a web server or for transmission of multimedia data to another electronic device. If the multimedia data transmission request is detected, the controller 260 segments the multimedia data according to a predetermined condition at step 315. The data segmentation may be performed in various ways according to the predetermined number of segments, predetermined size per data segment, or volume of multimedia data.

Figure 4:
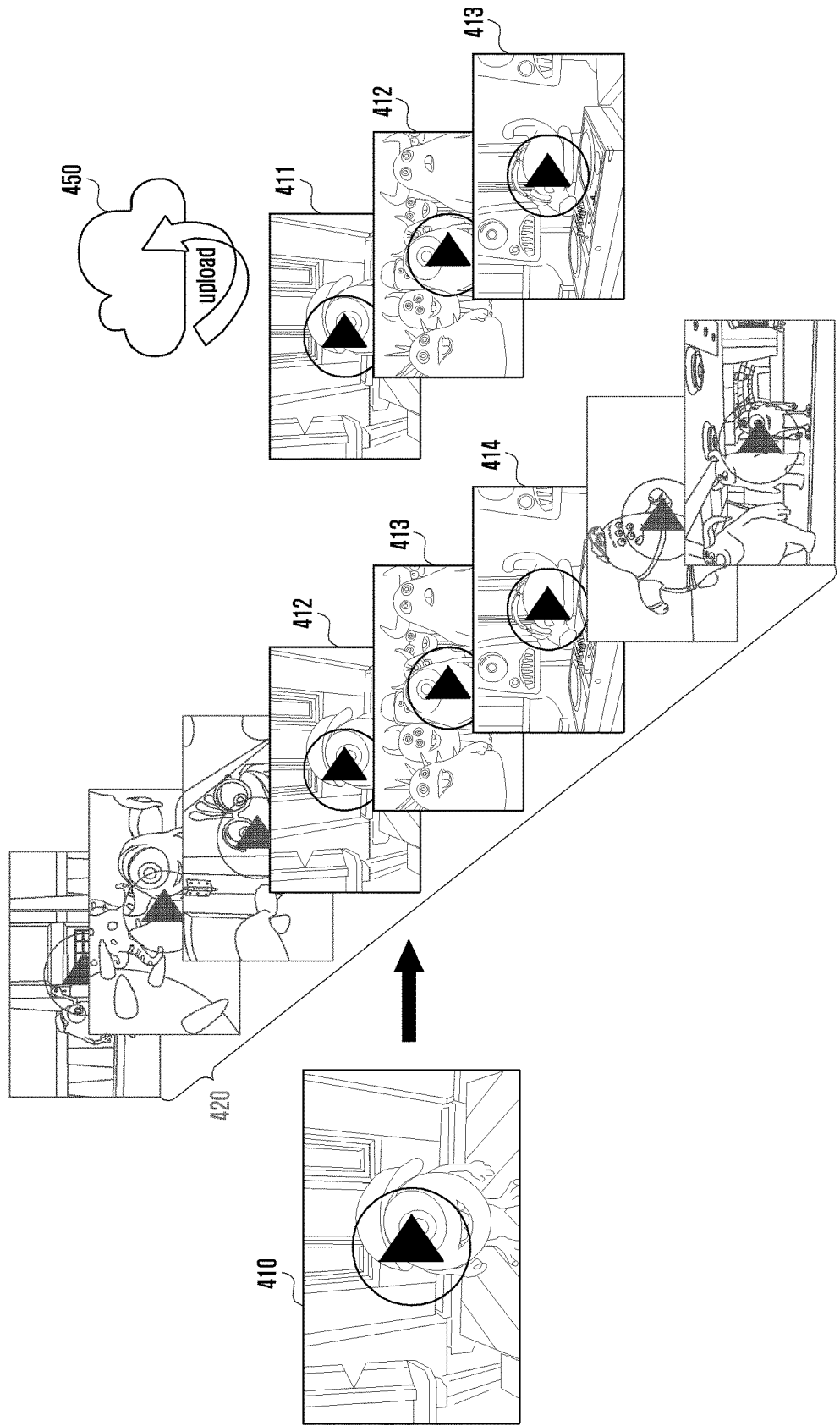
FIG. 4 is a diagram illustrating a multimedia segmentation operation according to an embodiment of the present disclosure.

A detailed description of step 315 is made with reference to FIG. 4.

FIG. 4 is a diagram illustrating a multimedia segmentation operation according to an embodiment of the present disclosure. FIG. 4 shows the detail of step 315 of FIG. 3. Reference number 410 of FIG. 4 denotes the video data stored in an electronic device. The video data 410 are segmented into a plurality of data segments. The data segments may be uploaded to the server 450 (or transmit to another electronic device), and may constitute all of the data segments or some data segments 411, 412, and 413 selected according to predetermined criteria (or selected by the user).

After step 315, the controller 260 determines whether a selective data segment transmission request is made by the user is detected at step 320. If the selective data segment transmission request is detected, the controller 260 selects the corresponding data segments at step 325.

The data selection operation of step 325 may be carried out by a user input or autonomously according to predetermined criteria. The data segment selection operation is described in more detail with reference to FIGS. 5 and 6.

Figure 5:
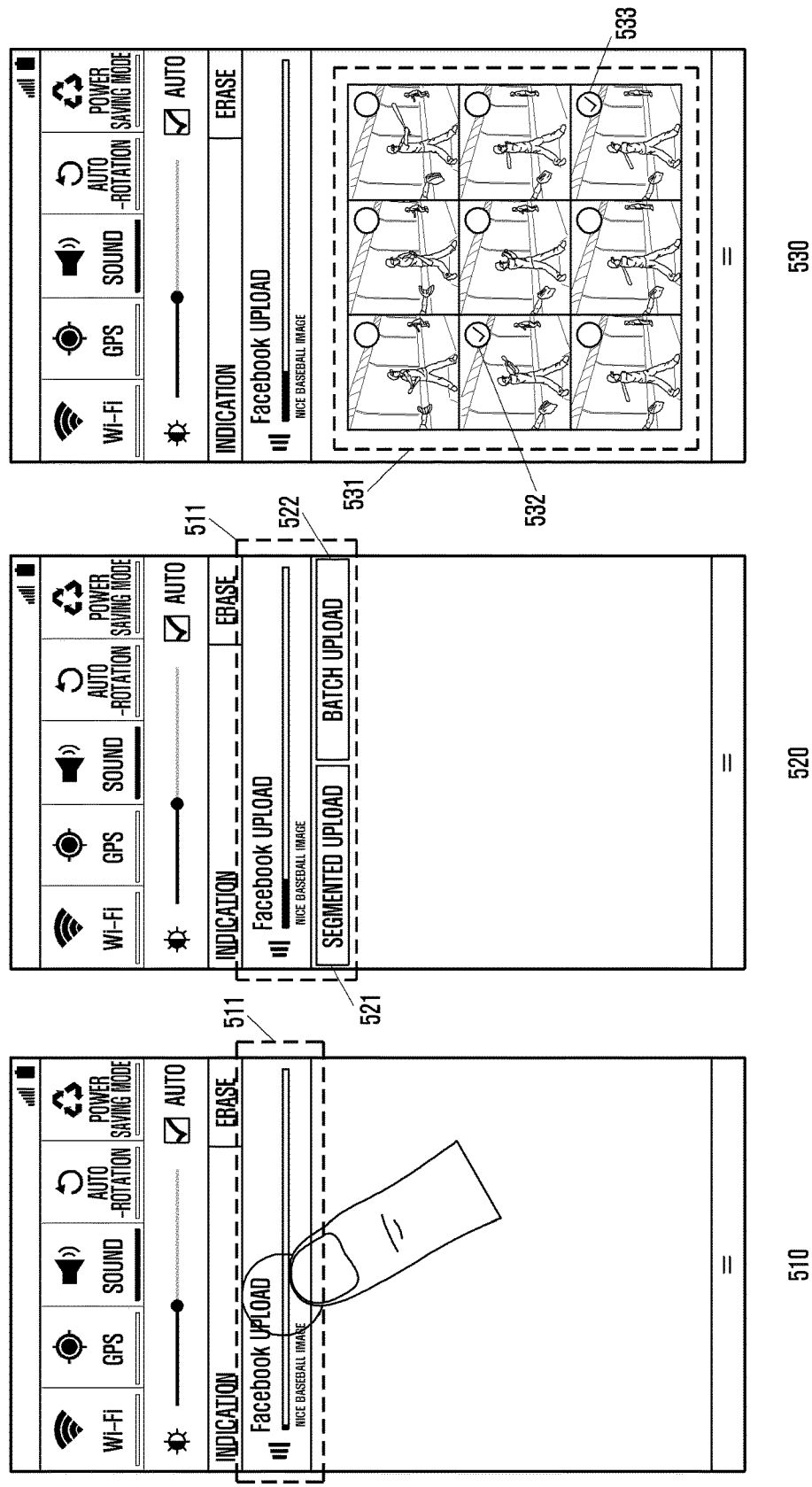
FIG. 5 is a diagram illustrating screen displays illustrating the operation of selecting data segments and transmitting the selected data segments according to an embodiment of the present disclosure.

FIG. 5 is a diagram illustrating screen displays illustrating the operation of selecting data segments and transmitting the selected data segments according to an embodiment of the present disclosure.

Reference number 510 of FIG. 5 denotes a screen displaying a status indicator 511 indicating the status of uploading multimedia data from the electronic device 200 to the server. If the user selects the status indicator 511, buttons appears in order for the user to opt to transmit the multimedia data as a single file or data segments as shown in the screen display denoted by reference number 520. The buttons may include a segmented upload button 521 and a batch upload button 522 as shown in the screen display denoted by reference number 520. If the segmented upload button 521 is selected, the data segments 531 are displayed on the screen as denoted by reference number 530. The user may select some of the data segments 531. If a user input for transmission is detected in this state, the electronic device transmits only the selected data segments 532 and 533 but not the non-selected data segments. According to various embodiments of the disclosure, in the case where the non-selected data segments have been uploaded already, they may be deleted after being uploaded. For example, the electronic device 200 may transmit a signal requesting for deleting the non-selected data segments along with the data segments.

In the case of segmenting the multimedia data and transmitting part of the data segments as described above, the user may select the data segments to be transmitted. However, the present disclosure is not limited thereto but may include selecting data segments to be transmitted autonomously according to predetermined conditions. The autonomous data segment selection operation may include deselecting data segments having no image or sound. The autonomous data segments selection operation may be carried out according to various criteria. A description is made of the operation of changing resolution of selected data segments and transmitting the resolution-changed data segments.

Figure 6:
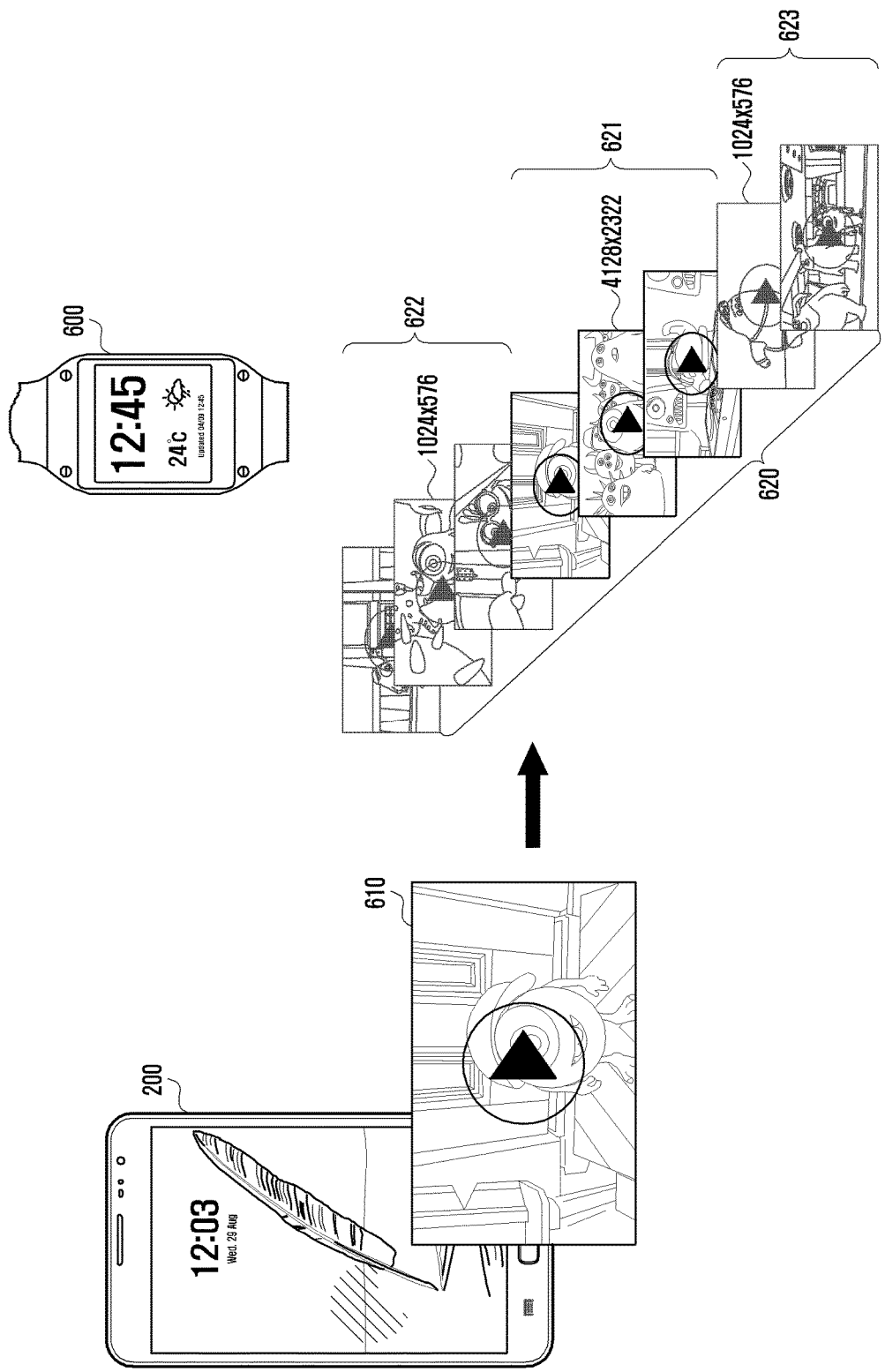
FIG. 6 is a diagram illustrating the operation of changing the resolution of the data segments according to an embodiment of the present disclosure.

FIG. 6 is a diagram illustrating the operation of changing the resolution of the data segments according to an embodiment of the present disclosure.

Reference number 610 of FIG. 6 denotes non-segmented video data stored in the electronic device. When it is required to transmit data from the electronic device 200 to another electronic device 600, the electronic device 200 may check the properties (e.g. storage capacity, battery capacity, and available communication protocols) of the peer electronic device 600 connected wirelessly. If the data rate obtained based on the storage capacity, battery capacity, and available communication protocol of the peer electronic device is equal to or less than a predetermined threshold, the electronic device 200 may transmit the video data 610 by reducing the resolution of the non-selected data segments 622 and 623 while maintaining the resolution of the selected data segments 621. At this time, the data segments 621 of which resolution are maintained may be selected by the user manually, or by the electronic data 200 autonomously. For example, the electronic device 200 may maintain the resolution of the data segments having the frames including many important objects (i.e. persons, foreground images, etc.) and decrease the resolution of the data segments without important objects, (i.e. the data segments including only the background image. The electronic device 200 may decrease the resolution of the frames with the exception of the frames fulfilling a predetermined condition. For example, the electronic device 100 may decrease the resolution of the data segments with the exception of the duration corresponding to I-FRAME and P-FRAME. The electronic device 200 may also change (i.e., decreases) the resolution of all data segments without a data segment selection process.

The controller 260 may select some of the data segments according to the user input or autonomously. Afterward, the controller 260 transmits the selected data segments at step 335.

If no selective data segment transmission request is detected at step 320, the controller 260 selects all of the data segments at step 330. The data segments are transmitted (uploaded) to another electronic device or server at step 335.

According to various embodiments of the present disclosure, if the video data are segmented unnecessarily finely, the data segments may be combined according to a predetermined rule and then uploaded. A description thereof is made with reference to FIGS. 7A and 7B.

Figure 7A:
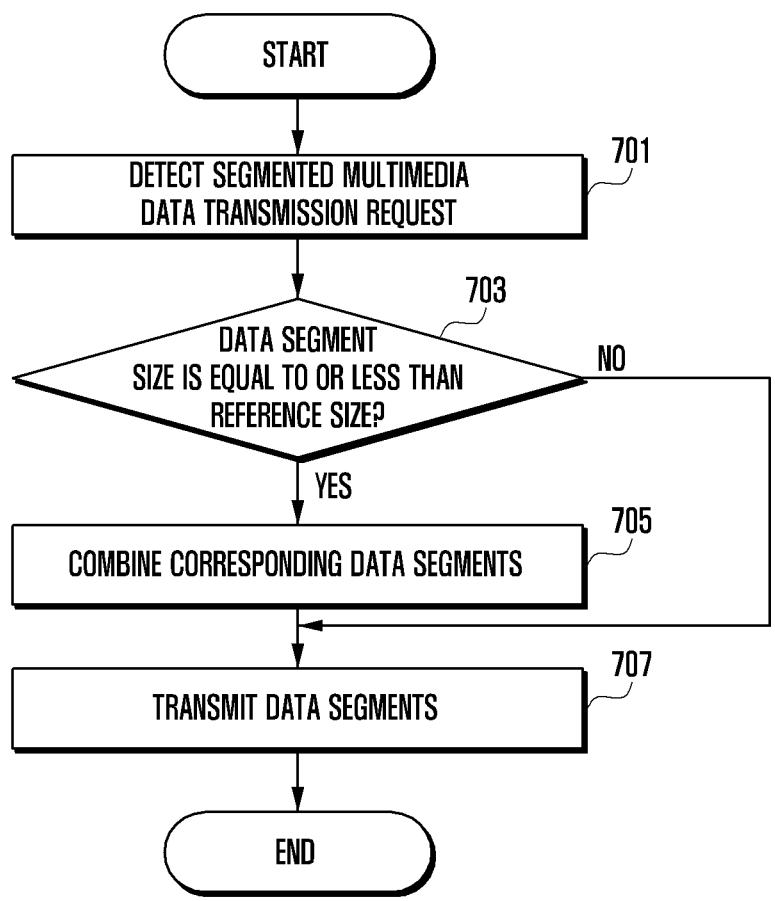
FIG. 7A is a flowchart and FIG. 7B is a drawing illustrating the operation of combining data segments according to an embodiment of the present disclosure.
Figure 7B:
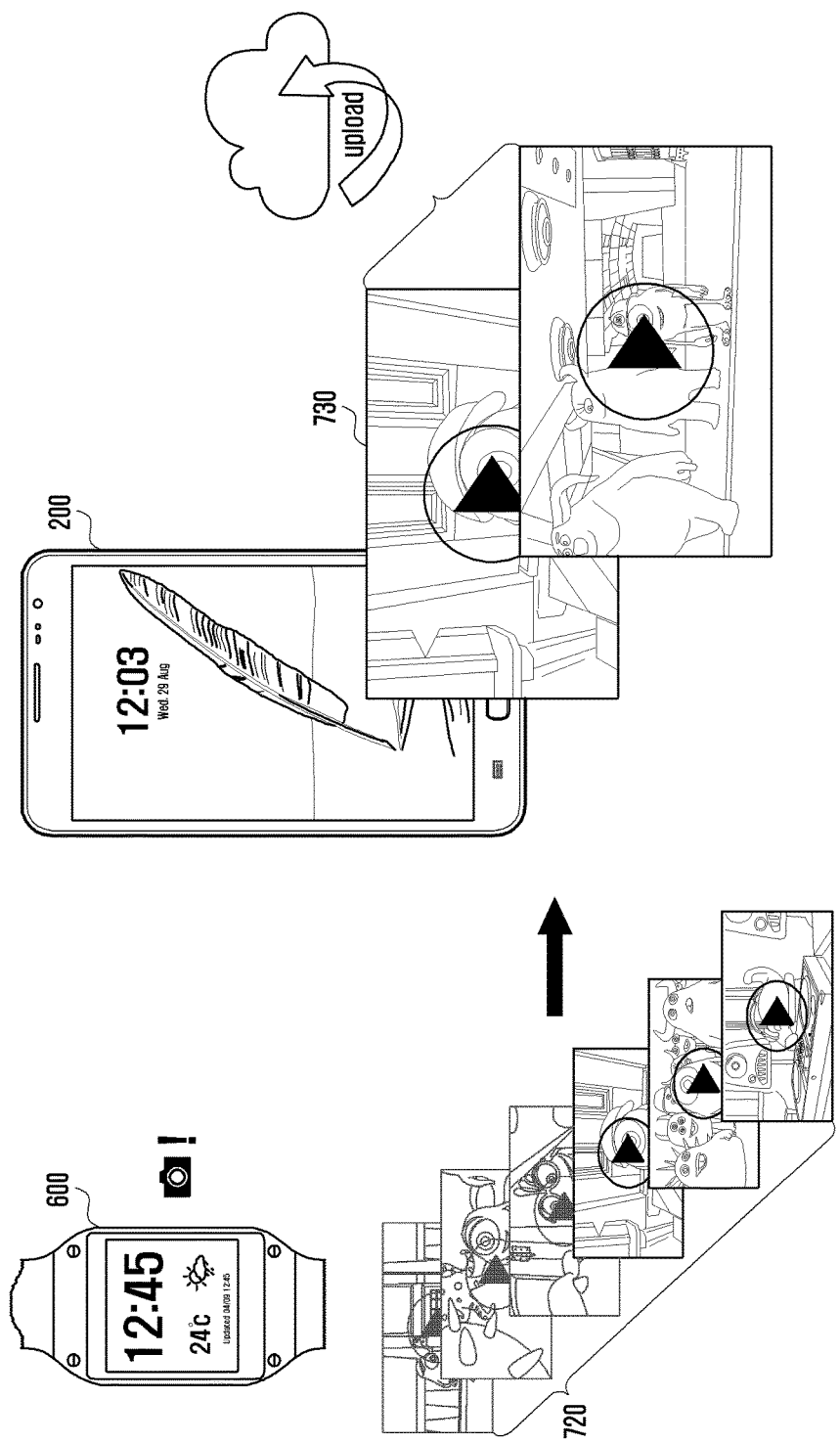

FIGS. 7A and 7B are drawings illustrating the operation of combining data segments according to an embodiment of the present disclosure.

Referring to FIG. 7A, at S701, the electronic device 200 receives a segmented multimedia data transmission request. Then, at S703, the controller 260 determines whether the data segment size is equal to or less than a reference size. The reference size may denote a minimum segment size. If the data segment size is equal to or less than the reference size, pluralities of successive data segments can be combined until the minimum segment size is reached. Then the controller 260 transmits the combined data segments to the server or another electronic device at step 707.

A description is made of the operation of combining data segments with reference to FIG. 7B. In the case that the electronic device 600 is a wearable device with small storage capacity, the video may be captured in units of predetermined time duration. The video data 720 produced in the form of a series of data segments are stored in the electronic device 600. The electronic device 200 may store the downloaded data segments. If it is required to upload the multimedia data to the server in the form of data segments, the electronic device 200 determines whether the size of each of the data segments 720 is equal to or less than the reference size (minimum segment size). If it is determined that the data segment size is equal to or less than the minimum segment size, the electronic device 200 combines the six data segments 720 into two data segments 730. Afterward, the electronic device 200 uploads the two data segments 730 to the server. Although the description is made of the case with a specific number of data segments for explanation convenience and illustrative purposes, the video data may be segmented into more data segments or fewer.

Figure 8A:
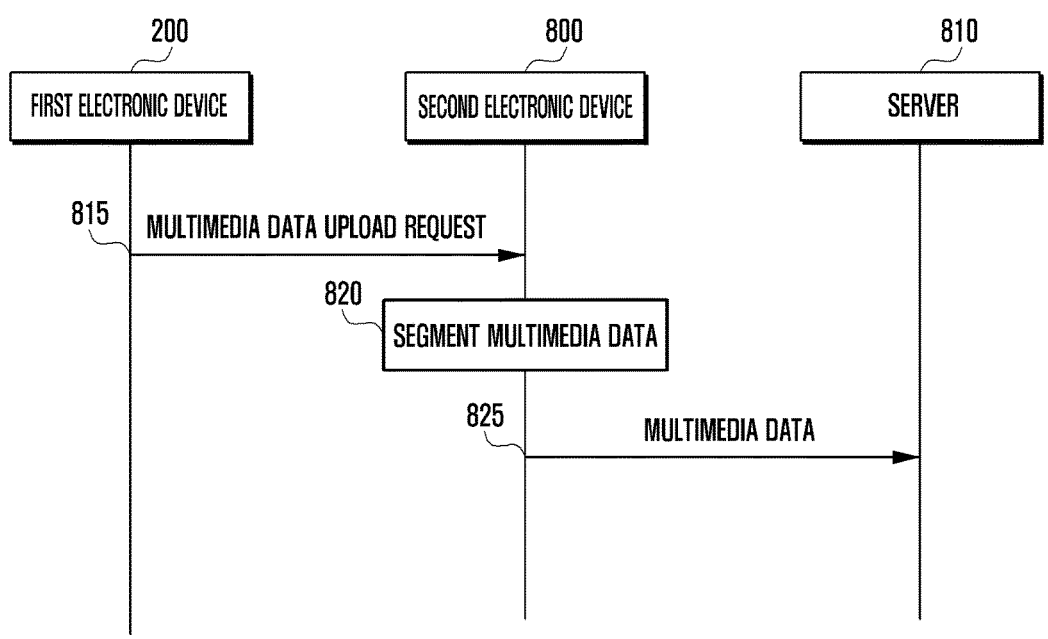
FIG. 8A illustrates the communication path from devices to a server to illustrate a method of uploading multimedia data with a second electronic device according to various embodiments of the present disclosure.

FIGS. 8A and 8B are drawings illustrating a method of uploading multimedia data with a second electronic device according to various embodiments of the present disclosure. FIG. 8A shows the signal flow between the first electronic device 200, second electronic device 800, and server 810.

Referring now to FIG. 8A, the first electronic device 200 may upload multimedia data (e.g. video) to the server 810 via the second electronic device 800. According to various embodiments of the present disclosure, if the video is uploaded via the second electronic device 800, this is likely to be the case where the first electronic device 200 does not need to upload the data in real time or the same file exists in the first and second electronic devices 200 and 800. In such a case that the second electronic device 800 is may be a personal cloud electronic device which does not incur additional communication cost and has low battery consumption.

In the operational procedure of FIG. 8A, at S815 the first electronic device 200 sends the second electronic device 800 a multimedia data upload request. Next, at S820, the second electronic device 800 segments the multimedia data. The second electronic device uploads the data segments to the server 810 at step 825.

FIG. 8B shows a situation in which the first electronic device 200 makes a request to the second electronic device 800 for video upload. In this way, the first electronic device 200 may make a request for uploading a relatively large volume of the multimedia data to the server 810. In this case, if the multimedia data upload request is received, the second electronic device 800 segments the multimedia data and uploads the data segments to the server 810 according to an embodiment of the present disclosure. At this time, multimedia data upload request may include text data such as a file name or a command.

A description is made of the multimedia data download procedure hereinafter.

Figure 9A:
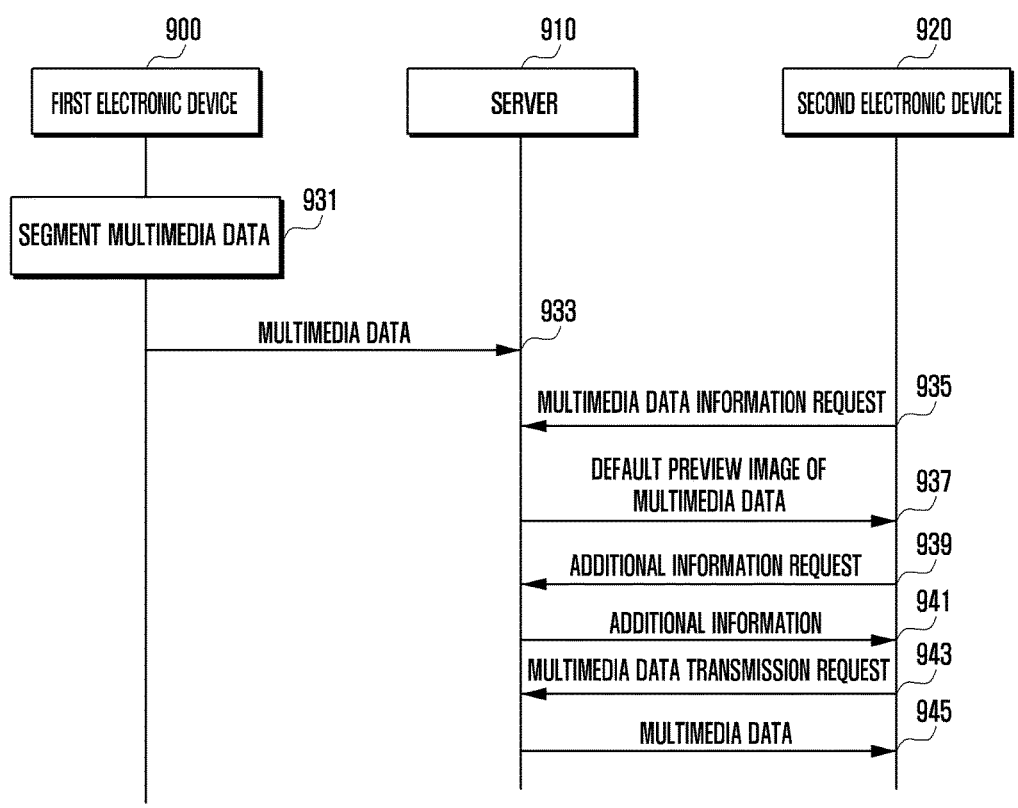
FIG. 9A illustrates a signal flow diagram illustrating the multimedia data download procedures according to embodiments of the present disclosure.
Figure 9B:
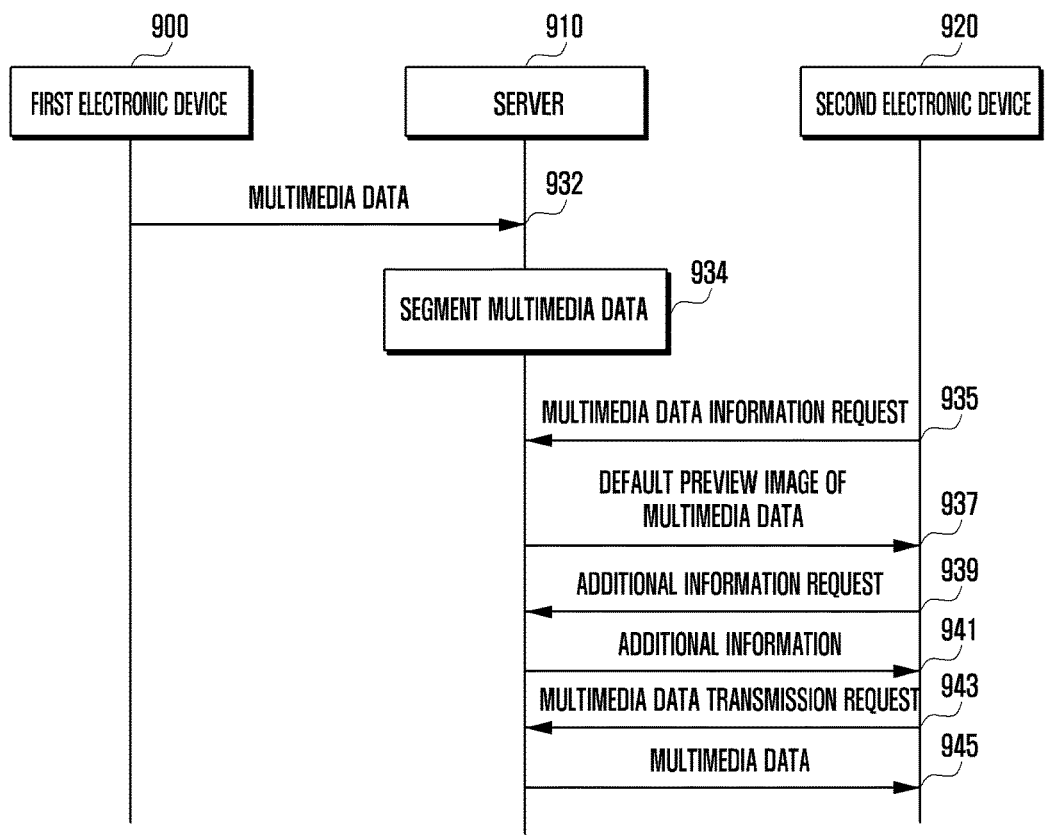
FIG. 9B illustrates another signal flow diagram illustrating the multimedia data download procedures according to embodiments of the present disclosure.

FIGS. 9A and 9B are signal flow diagrams illustrating various multimedia data download procedures according to embodiments of the present disclosure.

Referring now to FIG. 9A, if it is required to upload multimedia data to the server 910, at S931 the first electronic device 900 segments the multimedia data. Next, at S933, the first electronic device 900 uploads the multimedia data to the server 910 in the form of a series of data segments. In this way, the multimedia data may be segmented by the first electronic device 900 before being uploaded. In the case that the multimedia data are uploaded to the server 910 without being segmented, the server 910 may segment the multimedia data into data segments. Thus the server 910 stores the multimedia data in the form of a plurality of data segments.

The second electronic device 920 receives the information on the multimedia data uploaded to the server 910 through communication with the server 910. The first and second electronic device 900 and 920 may be separate devices or the same device.

At S935, the second electronic device 920 sends the server 910 a multimedia data information request. For example, the operation at step 935 may be of displaying a webpage including the multimedia data provided by the server 910. At S937, in response to the multimedia data information request, the server 910 sends the second electronic device 920 a default preview image (e.g. representative image of the video) corresponding to the multimedia data. At S939, if the basic preview image is received, the second electronic device 920 sends the server 910 an additional information request. The additional information may be the preview images or preview animations of the respective data segments. If the additional information request is received, at S941 the server 910 sends the second electronic device 920 the additional information. The steps of requesting for the additional information request and transmitting the additional information may be omitted depending on the embodiment.

With continued reference to FIG. 9A, at S943 the second electronic device 920 sends the server 910 a multimedia data transmission request. In response to the multimedia data transmission request, at S945, the server 910 transmits the multimedia data to the second electronic device 920.

While FIG. 9A shows an embodiment in which the multimedia data are segmented before being uploaded, FIG. 9B, shows where at S934 the multimedia data are segmented by the server 910.

According to various embodiments of the disclosure, with reference now to FIG. 9B, the data segments requested by the second electronic device 920 may be the data uploaded to the server 910 and then segmented by the server 910. The first electronic device 900 uploads the multimedia data to the server 910 at step 932. At S934, the server 910 segments the uploaded multimedia data. The subsequent operations of signal exchange between the server 910 and the second electronic device 920 are identical with S935 to S945.

A description is made of the multimedia data transmission request and multimedia data reception operations of the second electronic device hereinafter with reference to FIG. 10.

Figure 10:
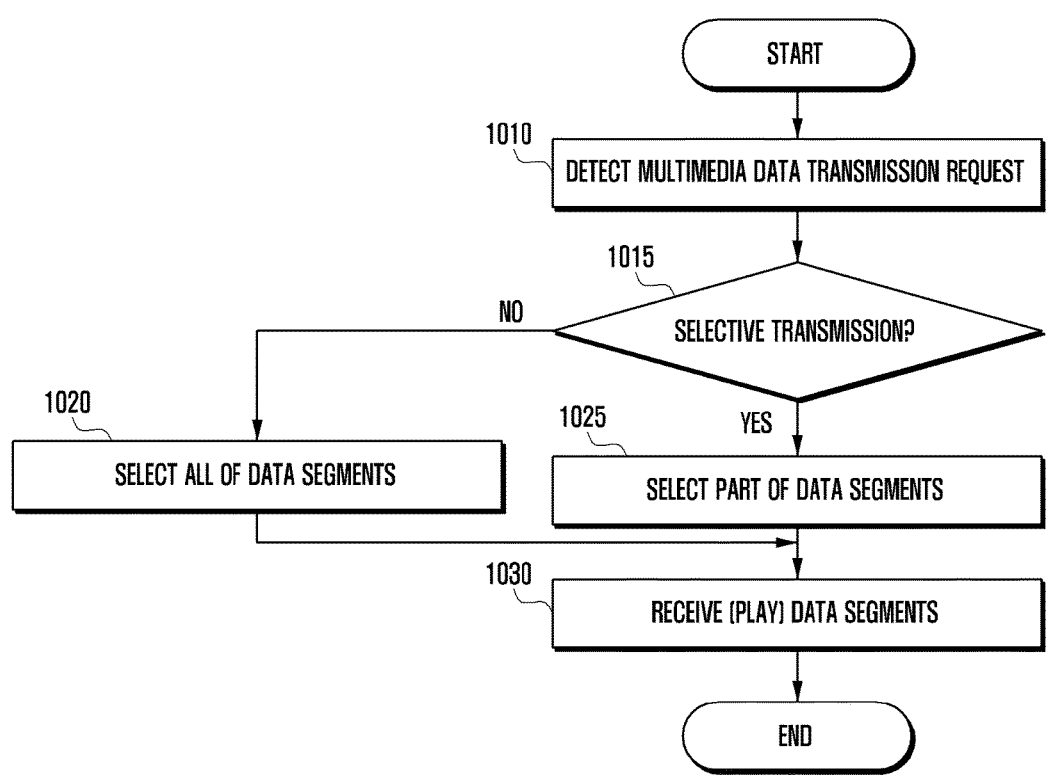
FIG. 10 is a flowchart illustrating an operation of a multimedia data reception procedure according to an embodiment of the present disclosure.

FIG. 10 is a flowchart illustrating a multimedia data reception procedure according to an embodiment of the present disclosure. In FIG. 10, it is assumed that the multimedia data are in the form of data segments.

At S1010, the controller 260 detects a multimedia data transmission request. For example, the controller 260 may determine whether a multimedia playback input made to a video on a webpage. Next, at S1015, the controller 260 determines whether multimedia data transmission request is a selective multimedia data transmission request. For example, the controller 260 may determine whether to play the video data provided by the web server as a whole or some selected data segments. S1015 is described in more detail hereinafter.

If it is determined that the multimedia data transmission request is a selective multimedia data transmission request, then at S1025 controller 160 selects the data segments to receive and then at S1030 actually receives the selected data segments. For example, the data segment selection operation may be of selecting one of a plurality preview images (representative images of data segments). The reception (download) operation may include playing a multimedia data stream from the web server.

A description is now made of the selective data segment reception procedure with reference to FIGS. 11A, 11B, 12A, and 12B.

FIGS. 11A and 11B are diagrams illustrating screen displays illustrating the procedure of providing additional information of multimedia according to an embodiment of the present disclosure.

In FIG. 11A, reference number 1110 denotes an exemplary screen display showing a preview image 1111 of the video data on a webpage (e.g., SNS page). The preview image may be the first image frame of the video data. Reference number 1120 denotes an exemplary screen display illustrating a pinch-to-zoom gesture made on the preview image 1111 of the video data. In the case that the pinch-to-zoom gesture is made on the preview image 1111 of the video data, in which such video data is provided in the form of data segments according to the present disclosure, a plurality of preview images 1113 may be displayed as shown in exemplary screen display(s) such as denoted by reference number 1130. The plural preview images may be the representative images of the respective data segments constituting the multimedia data. The data segments initially shown may be have been selected for display based on a predetermined scheme. For example, at certain time points of the video (¼, ½, ¾, etc.) It is also possible that the initial data segments shown could be presented based on a history of selected segments, and it should be noted these are only a few examples of the many ways the initial segments are initially provided for display.

The plural preview images 1113 may be generated from the corresponding data segments in response to the pinch-to-zoom operation. The preview images may be the ones generated in advance from the corresponding data segments. In this case, if the pinch-to-zoom gesture is detected, the electronic device may just load the previously generated preview images to display on the screen. FIG. 11A is directed to an exemplary case where 4 preview images are displayed.

In FIG. 11B, reference number 1140 denotes an exemplary screen display showing the pinch-to-zoom gesture made on the preview images 1113. If the pinch-to-zoom gesture, which in this case relative FIG. 11A screen 1120 would be a second pinch-to-zoom gesture (or some other gesture), is made onto a set of 4 preview images as denoted by reference number 1113, more preview images 1115 may be displayed on the screen as denoted by reference number 1150. The preview images 1115 are greater in number than the preview images 1113 displayed before the pinch-to-zoom gesture is made. It is also within the spirit and scope of the invention that one could perform a pinch-to-zoom on one of the data segments, and could then see a greater number of segments within the time frame of the segment touched by the pinch-to-zoom, for example, by retrieving segments successively before or after the segment receiving the gesture, or by some predetermined interval.

It is also within the ambit of this disclosure that if segment shows a particular character, person, image, the electronic device could show more segments that have the particular character in them. Furthermore it is also within the ambit of this disclosure, than although not shown, a response to voice recognition could also be a basis as to which data segments are displayed. For example, one could say the name of a character or actor in the video, and the data segments retrieved can be selected based on the data segments being tagged in some descriptive fashion for a controller to retrieve. For example, metadata, closed captioned data, are just some non-limiting examples.

Figure 12B:
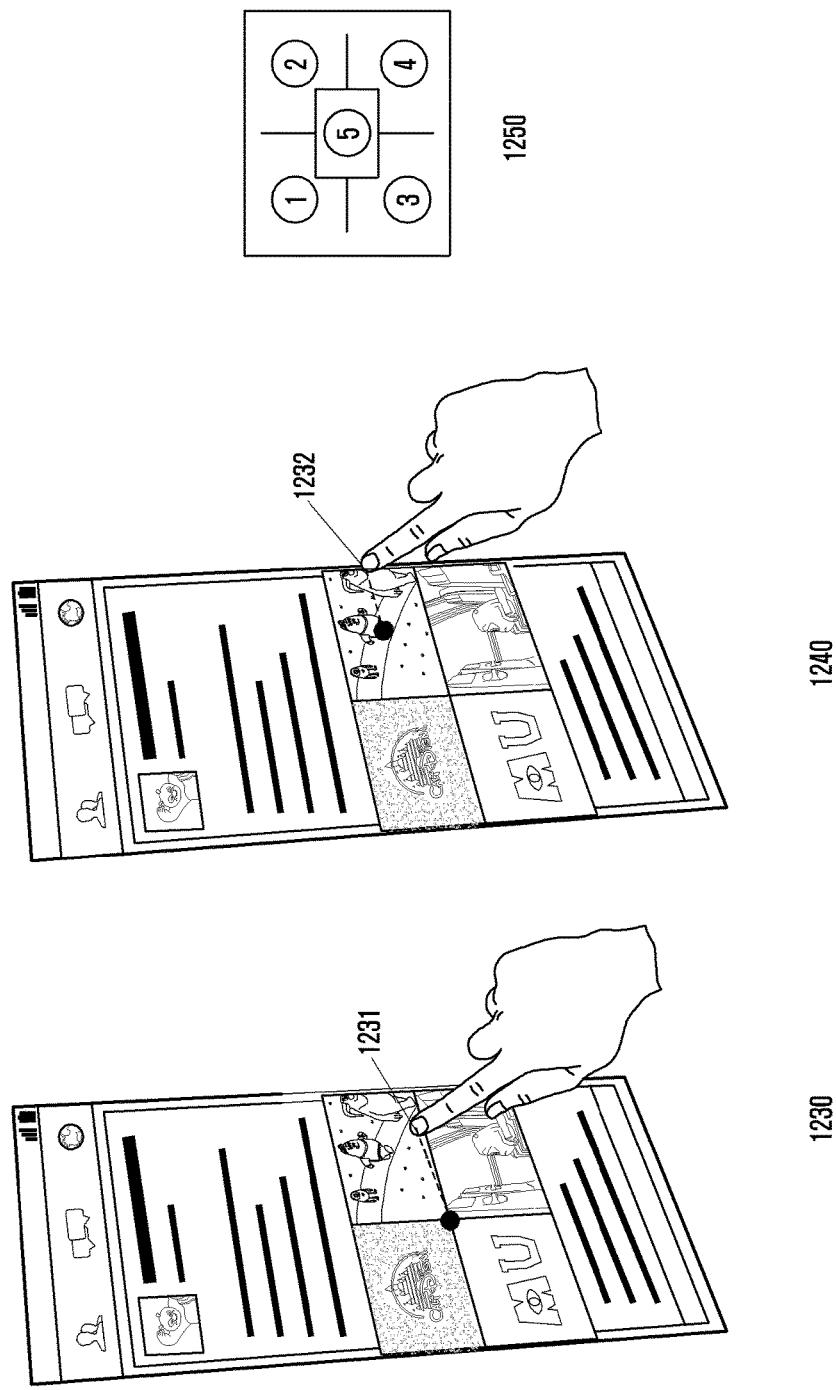

FIGS. 12A and 12B are diagrams illustrating a method of requesting for additional information of multimedia data by utilizing a proximity input according to an embodiment of the present disclosure.

In FIG. 12A, reference number 1210 denotes a situation in which a proximity input is made at a position of the preview images of the multimedia data presented on a webpage. The proximity input may be a gesture input made with an input object (e.g. finger and touch pen) in a distance from an input detection device (e.g. touch panel) such as hovering gesture. If the proximity input is detected on the preview image, the controller 260 controls the electronic device to receive additional information of the multimedia data (e.g. preview images of the data segments) from the server and display the additional information. If a plurality of preview images is received in response to the proximity input, the controller 260 may control to display the preview images in a regular time interval sequentially. For example, the preview images may be played in the form of a preview animation or an animation GIF. The number of preview images for forming the preview animation may vary depending on the proximity input signal strength. The shorter the distance between the screen and the touch means (e.g. finger) is, the stronger the proximity input signal strength is (see the distance 1211 in the exemplary situation denoted by reference number 1210 and the distance 1212 in the exemplary situation denoted by reference number 1220). The stronger the proximity input signal strength is, the more the number of frames constituting the preview animation is. For example, the preview animation is made of 4 frames in the situation denoted by reference number 1210 and 16 subframes in the situation denoted by reference number 1220. In other words, based on the proximity input of a touch means such as a finger, stylus, etc., the proximity input signal strength is one way the user can see a greater or lesser quantity of preview images. It is also possible that an electronic pen, for example, could have a control on it that can emit a signal that can be detected to change the quantity of preview images displayed.

According to one of various embodiments of the present disclosure, different preview animation is played depending on the position where the proximity input is detected. As denoted by reference number 1230 of FIG. 12B, if the proximity input is detected at a specific position of the preview images (e.g. center of the preview images or the playback button), the preview animation corresponding to the whole video data may be played. Meanwhile, if the proximity input is detected above one of the preview images (e.g. one of areas 1, 2, 3, and 4) as denoted by reference number 1240, the preview animation corresponding to the data segments represented by this preview image or adjacent images before or after this preview image.

If it is determined that the data transmission request is not the selective data transmission request in the procedure of FIG. 10, the controller 260 selects all of the data segments at S1020 and receives all of the data segments at S1030.

Figure 13:
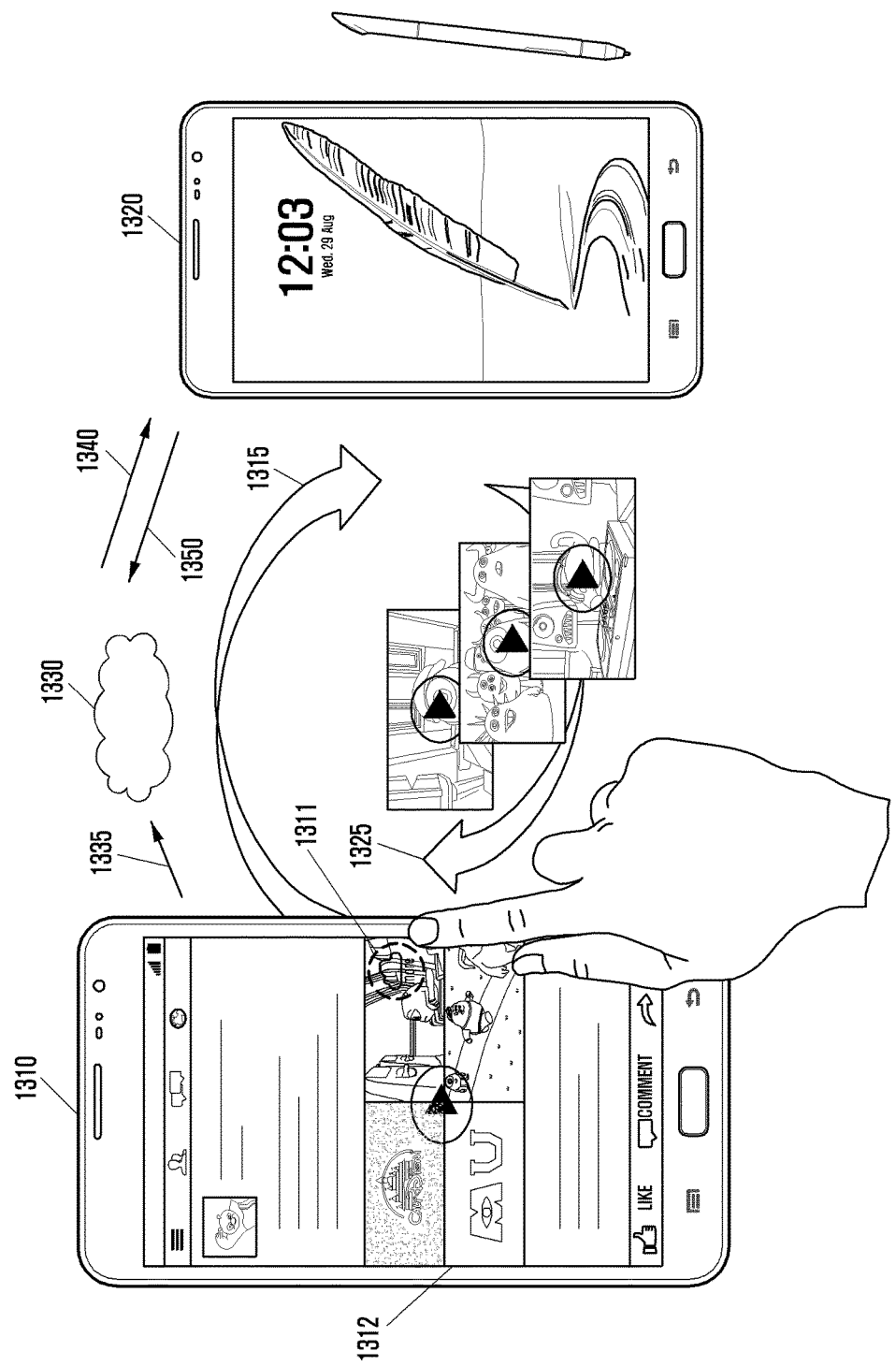
FIG. 13 is a diagram illustrating an operation of providing data segments constituting the multimedia data according to an embodiment of the present disclosure.

FIG. 13 is a diagram illustrating an operation of providing data segments constituting the multimedia data according to various embodiments of the present disclosure.

In the case where only part of the data segments constituting the multimedia data are uploaded, the server may check the information thereon. For example, when the multimedia data are segmented, every data segment is assigned a sequence value, which is included in the packet carrying the data segment. Accordingly, the sequence values of the selectively uploaded data segments may not be sequential. Thus, the electronic device can determine whether the multimedia data are segmented and whether the data segments are uploaded as a whole or selectively.

In the case where the server provides part of the data segments, the first electronic device 1310 may display an icon 1311 indicating that there are other data segments along with a list of the data segments received from the server. If the user selects the icon 1311 displayed by the first electronic device 1310, the first electronic device 1310 sends to the second electronic device 1320 (upload device) an additional data segments request signal based on the multimedia data information as denoted by reference number 1315. For this particular operation, the second electronic device 1320 (upload device) may transmit the data segments in response to the additional data request in the initial data upload process. The second electronic device 1320 may transmit the additional data segments in response to the corresponding request signal through a short range wireless communication (e.g. Wi-Fi direct) link.

In another embodiment, if the additional data segments request icon 1311 is selected, the first electronic device 1310 transmits to the server 1330 a signal notifying that the corresponding icon 1311 is selected. This transmission provides the corresponding multimedia data as denoted by reference number 1335. Afterward, the server 1330 transmits a push notification indicating that the additional data segments are requested to the second electronic device 1320 which uploads the multimedia data. Then the user of the second electronic device 1320 checks the additional data segments request and may manipulate the second electronic device 1320 to upload additional data segments to the server 1330 as denoted by reference number 1350. The additional data upload may be performed according to the user's manipulation or autonomously.

Figure 14A:
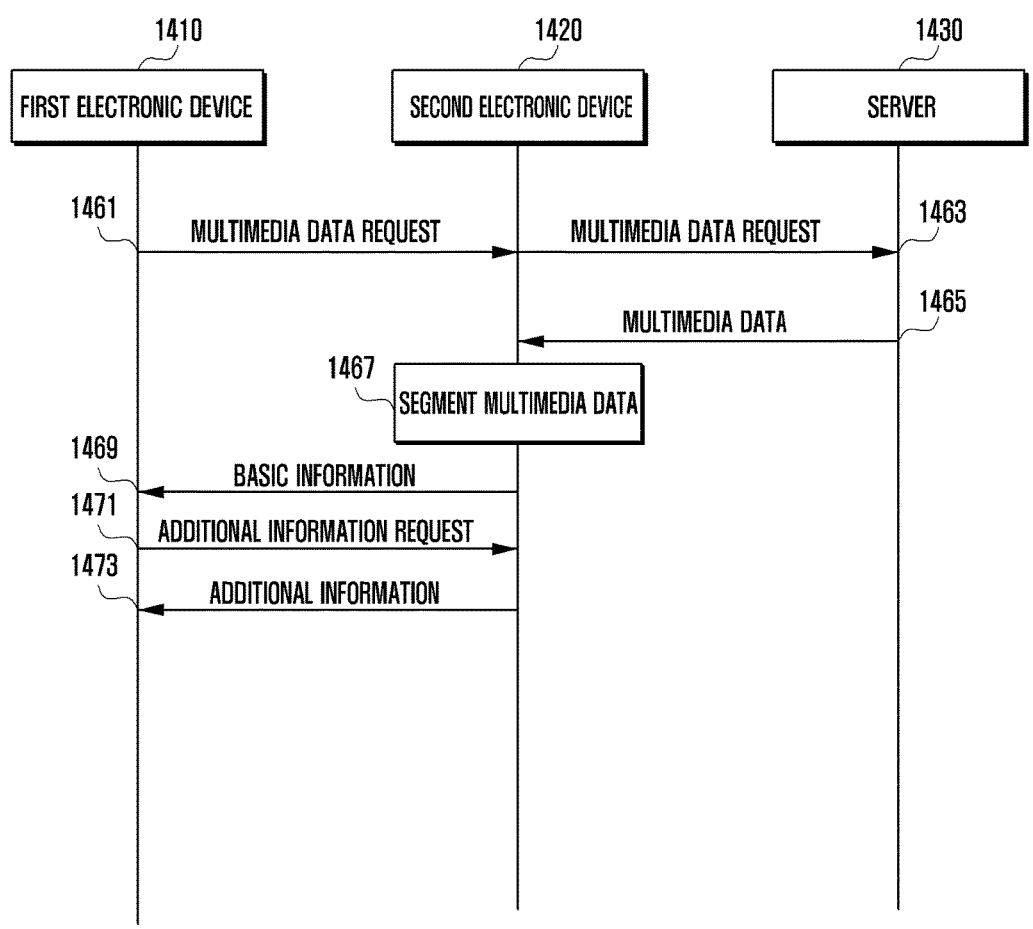
FIG. 14A is a signal flow diagram.
Figure 14B:
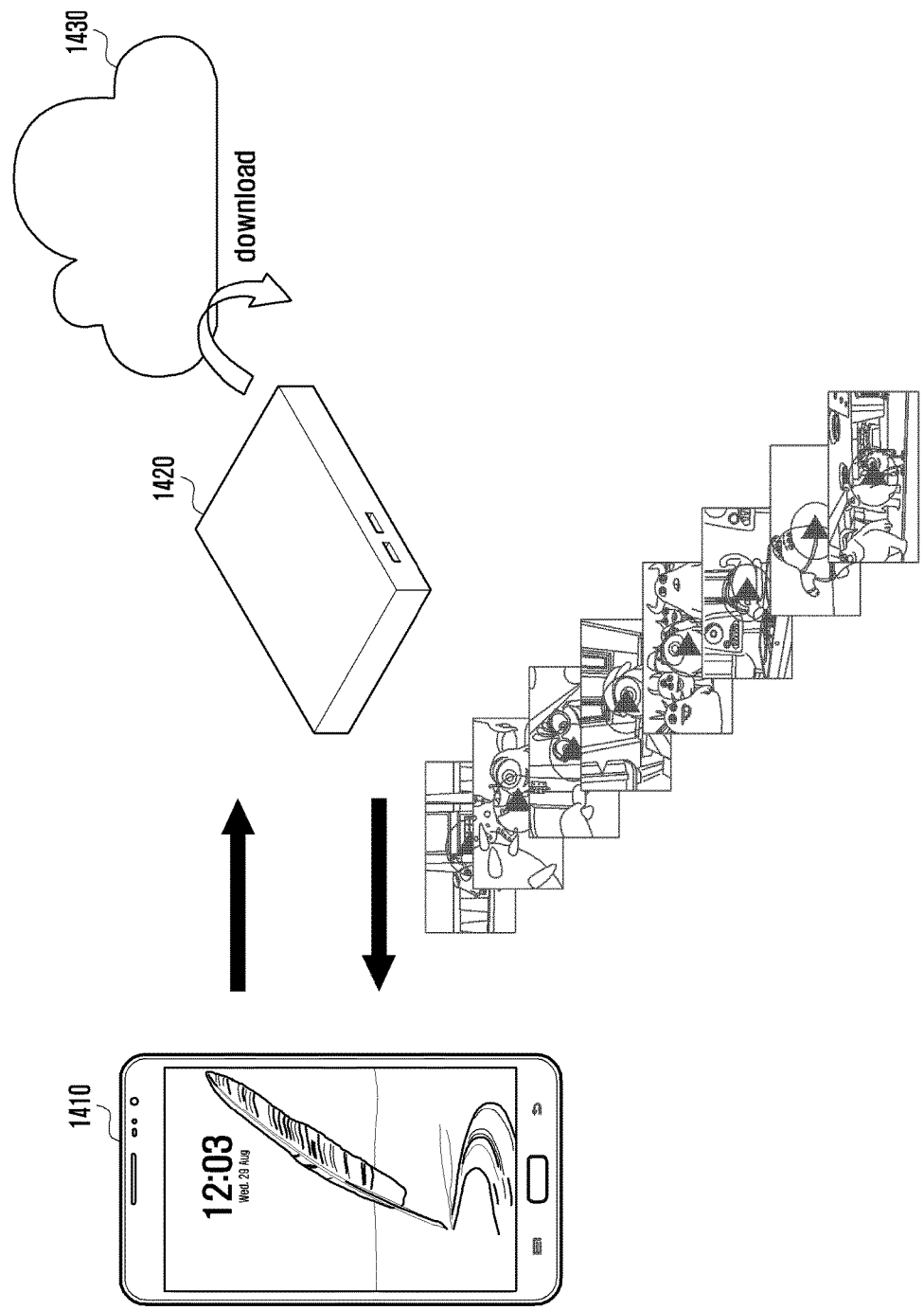
FIG. 14B illustrates a procedure of receiving segmented data with an extra electronic device according to an embodiment of the present disclosure.

FIGS. 14A and 14B are drawings illustrating a procedure of receiving segmented data with an extra electronic device according to an embodiment of the present disclosure.

Referring now to FIG. 14A, the first electronic device 1410 sends the second electronic device 1420 a multimedia data request at step 1461, and the second electronic device 1420 forwards the multimedia data request to the server 1430 at step 1463. Then the second electronic device 1420 downloads the multimedia data from the server 1430 at step 1465. Next, the second electronic device 1420 segments the downloaded multimedia data at step 1467. The second electronic device 1420 sends the first electronic device 1410 the basic information on the downloaded multimedia data (e.g. basic preview image) at step 1469. If the first electronic device 1410 sends the second electronic device 1420 an additional information request at step 1471, the second electronic device 1420 sends the first electronic device 1410 the additional information at step 1473. The additional information may be additional preview images as described above.

Referring now to FIG. 14B, the first electronic device 1410 sends the second electronic device 1420 the multimedia data download request signal as described with reference to FIG. 14A. For example, the first electronic device 1410 may sends the second electronic device 1420 the multimedia data download request signal in consideration of at least one of data communication cost, battery consumption, overheating, and other ongoing tasks. The request signal may include a web address of the location of the multimedia data. The second electronic device 1420 may be a wireless communication-enabled device (e.g. personal cloud electronic device) with a storage capacity larger than that of the first electronic device 1410. The second electronic device 1420 may receive the multimedia data from the server 1430 in response to the multimedia data request transmitted by the first electronic device 1410. The second electronic device 1420 can store the multimedia data in the form of data segments of which information is provided to the first electronic device 1410 selectively. For example, the second electronic device 1420 may provide the first electronic device 1410 with a main data segment of the multimedia data or preview images of the respective data segments.

According to various embodiments of the present disclosure, the data transmission method may include detecting a multimedia data transmission request, segmenting the corresponding multimedia data according to predetermined conditions in response to the multimedia data transmission request, and transmitting the data segments as a whole or selectively. The response may include determining whether to segment the multimedia data, and transmitting the data segments selectively may include selecting may include selecting the data segments to be transmitted according to the user's selection input or a predetermined rule. Transmitting the data segment may include changing resolution or size of at least part of the data segments. In the case of transmitting the data segments, if at least one of the size and number of data segments is equal to or less than a predetermined threshold, the data segments may be combined.

According to various embodiments of the present disclosure, the data reception method may include displaying multimedia data divided into data segments, detecting a multimedia data reception request, and receiving the data segments as a whole or selectively in response to the request. At this time, if the reception request is detected, it may be possible for another electronic device to download the data segments as a whole or selectively, the downloaded data segments being forwarded to the electronic device which has transmitted the reception request. Detecting the multimedia data reception request may include detecting a request for additional data on the multimedia data. The additional information request may be made with a pinch-to-zoom gesture on a preview image of the multimedia data. If the additional information request is made through the pinch-to-zoom gesture on a preview image, more preview images corresponding to the other data segments are received and displayed. The additional information request may be made in response to a proximity input on at least part of the multimedia data and, in this case, at least one of the number of preview animations to be displayed and animation speed may be changed depending on at least one of the proximity input strength or distance. If the selection input is made to one of the preview images of the multimedia data, the data segment corresponding to the selected preview image is received and, otherwise if a selection input is detected at the center of the multimedia data, all of the data segments of the multimedia data are received as a whole. If some of the data segments constituting the multimedia data are not shown on a current display, an object may be displayed that indicates the existence of additional data segments along with the multimedia data in order for the user to select the object to receive the additional data segments from the electronic device which has uploaded the multimedia data.

Figure 15:
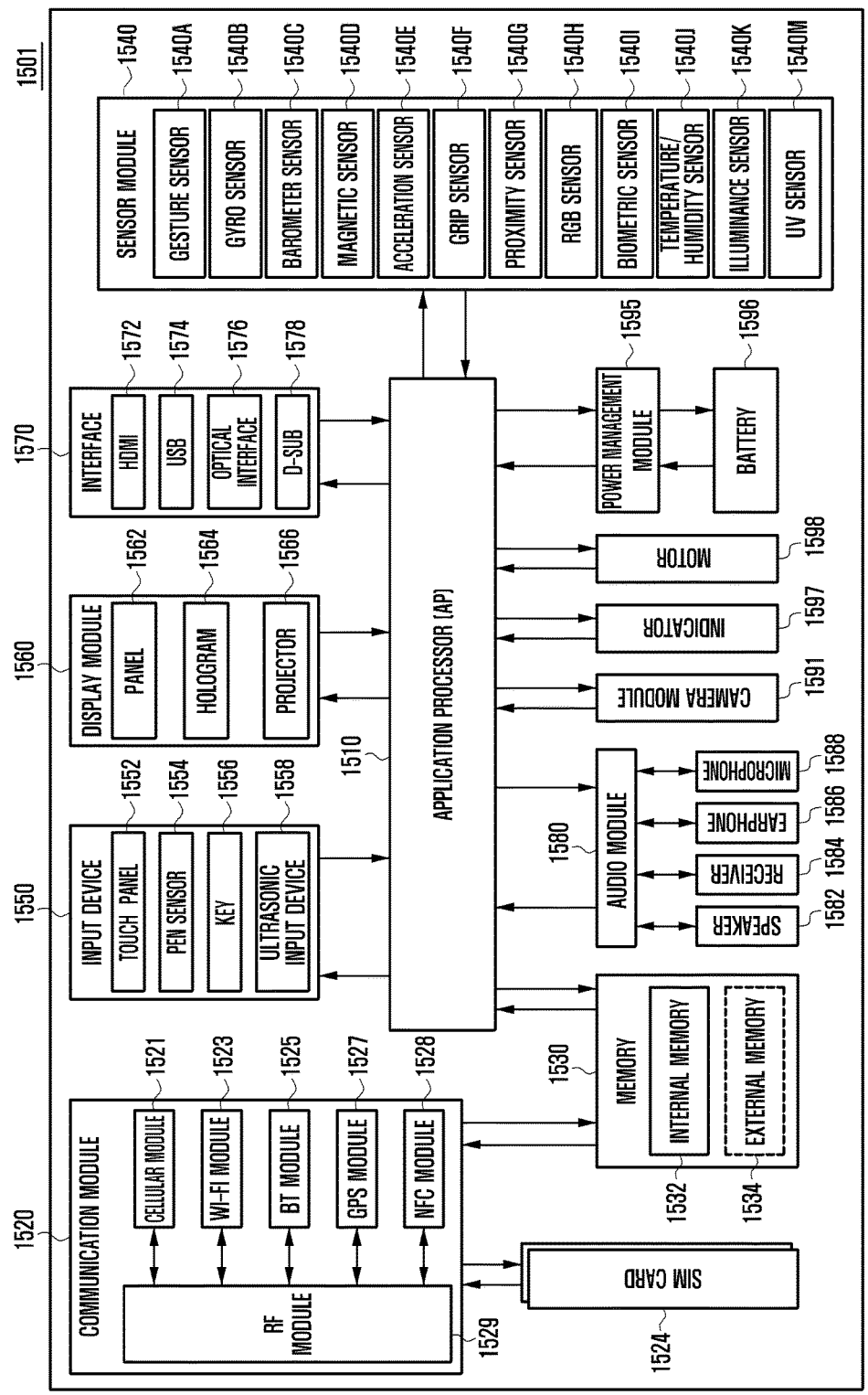
FIG. 15 is a block diagram illustrating a configuration of the storage device according to an embodiment of the present disclosure.

FIG. 15 is a block diagram illustrating an electronic device 1501 in accordance with an embodiment of the present disclosure. The electronic device 1501 may form, for example, the whole or part of the electronic device 101 shown in FIG. 1. Referring now to FIG. 15, the electronic device 1501 may include at least one application processor (AP) 1510, a communication module 1520, a subscriber identification module (SIM) card 1524, a memory 1530, a sensor module 1540, an input unit 1550, a display 1560, an interface 1570, an audio module 1580, a camera module 1591, a power management module 1595, a battery 1596, an indicator 1597, and a motor 1598. An artisan should understand and appreciate that not all of the items shown may be included in the electronic device, for example, only some of the sensors shown in the sensor module may be present.

The AP 1510 may drive an operating system or applications, control a plurality of hardware or software components connected thereto, and also perform processing and operation for various data including multimedia data. The AP 1510 may be formed of system-on-chip (SoC), for example. According to an embodiment, the AP 1510 may further include a graphic processing unit (GPU) (not shown).

The communication module 1520 (e.g., the communication interface 160) may perform a data communication with any other electronic device (e.g., the electronic device 104 or the server 106) connected to the electronic device 1501 (e.g., the electronic device 101) through the network. According to an embodiment, the communication module 1520 may include therein a cellular module 1521, a WiFi module 1523, a BT module 1525, a GPS module 1527, an NFC module 1528, and an RF (Radio Frequency) module 1529. One or more antennas, antenna arrays, etc, may be included for the various types of wireless communication.

The cellular module 1521 may offer, for example, one or more of a voice call, a video call, a message service, an Internet service, or the like through a communication network (e.g., LTE, LTE-A, CDMA, WCDMA, UMTS, WiBro, or GSM, etc.). Additionally, the cellular module 1521 may perform identification and authentication of the electronic device in the communication network, using the SIM card 1524. According to an embodiment, the cellular module 1521 may perform at least part of functions the AP 1510 can provide. For example, the cellular module 1521 may perform at least part of a multimedia control function.

According to an embodiment, the cellular module 1521 may include a communication processor (CP). An artisan should understand and appreciate that the term "processor" as used herein does not include pure software, or software per se. For example, the cellular module 1521 may be formed of SoC, for example. Although some elements such as the cellular module 1521 (e.g., the CP), the memory 1530, or the power management module 1595 are shown as separate elements being different from the AP 1510 in FIG. 15, the AP 1510 may be formed to have at least part (e.g., the cellular module 1521) of the above elements in an embodiment.

According to an embodiment, the AP 1510 or the cellular module 1521 (e.g., the CP) may load commands or data, received from a nonvolatile memory connected thereto or from at least one of the other elements, into a volatile memory to process them. Additionally, the AP 1510 or the cellular module 1521 may store data, received from or created at one or more of the other elements, in the nonvolatile memory.

Each of the WiFi module 1523, the BT module 1525, the GPS module 1527 and the NFC module 1528 may include a processor for processing data transmitted or received therethrough. Although FIG. 15 shows the cellular module 1521, the WiFi module 1523, the BT module 1525, the GPS module 1527 and the NFC module 1528 as different functional blocks for illustrative purposes, at least part of them may be contained in a single IC (Integrated Circuit) chip or a single IC package in an embodiment. For example, at least part (e.g., the CP corresponding to the cellular module 1521 and a WiFi processor corresponding to the WiFi module 1523) of respective processors corresponding to the cellular module 1521, the WiFi module 1523, the BT module 1525, the GPS module 1527 and the NFC module 1528 may be formed as a single SoC.

The RF module, which will include hardware such as a transmitter, receiver, transceiver, etc. 1529 may transmit and receive data, e.g., RF signals or any other electric signals. For example, although not shown, the RF module 1529 may include a transceiver, a PAM (Power Amp Module), a frequency filter, an LNA (Low Noise Amplifier), or the like. Also, the RF module 1529 may include any component, e.g., a wire or a conductor, for transmission of electromagnetic waves in a free air space. Although FIG. 15 shows that the cellular module 1521, the WiFi module 1523, the BT module 1525, the GPS module 1527 and the NFC module 1528 share the RF module 1529, at least one of them may perform transmission and reception of RF signals through a separate RF module in an embodiment.

The SIM card 1524 may be a specific card formed of SIM and may be inserted into a slot formed at a certain place of the electronic device. The SIM card 1524 may contain therein an ICCID (Integrated Circuit Card IDentifier) or an IMSI (International Mobile Subscriber Identity).

The memory 1530 (e.g., the memory 130) is a non-transitory memory and may include an internal memory 1532 and an external memory 1534. The internal memory 1532 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 1532 may have the form of an SSD (Solid State Drive). The external memory 1534 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 1534 may be functionally connected to the electronic device 1501 through various interfaces. According to an embodiment, the electronic device 1501 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein. The conversion of measured or sensed information may occur via an A/D converter.

The input unit 1550 may include a touch panel 1552, a digital pen sensor 254, a key 256, or an ultrasonic input unit 1558. The touch panel 252 may recognize a touch input (and may include near-touch/hovering detection) in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user The digital pen sensor 1554 may be formed in the same or similar manner as receiving a touch input or by using a separate recognition sheet. The key 1556 may include, for example, a physical button, an optical key, or a keypad. The ultrasonic input unit 1558 is a specific device capable of identifying data by sensing sound waves with a microphone 1588 in the electronic device 1501 through an input tool that generates ultrasonic signals, thus allowing wireless recognition. According to an embodiment, the electronic device 1501 may receive a user input from any external device (e.g., a computer or a server) connected thereto through the communication module 220.

The display 1560 (e.g., the display 150) may include a panel 1562, a hologram 1564, or a projector 15566. The panel 262 may be, for example, LCD (Liquid Crystal Display), AM-OLED 3333333 (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 1570 may include, for example, an HDMI (High-Definition Multimedia Interface) 1572, a USB (Universal Serial Bus) 1574, an optical interface 1576, or a D-sub (D-subminiature) 1578. The interface 1570 may be contained, for example, in the communication interface 160 shown in FIG. 1. Additionally or alternatively, the interface 1570 may include, for example, an MHL (Mobile High-definition Link) interface, an SD (Secure Digital) card/MMC (Multi-Media Card) interface, or an IrDA (Infrared Data Association) interface. The aforementioned are examples of possible interfaces that may be included.

The audio module 1580 may perform a conversion between sounds and electric signals. At least part of the audio module 1580 may be contained, for example, in the input/output interface 140 shown in FIG. 1. The audio module 1580 may process sound information inputted or outputted through a speaker 1582, a receiver 1584, an earphone 1586, or a microphone 1588.

The camera module 1591 is a device capable of obtaining still images and moving images. According to an embodiment, the camera module 1591 may include at least one image sensor (e.g., a front sensor or a rear sensor), a lens (not shown), an ISP (Image Signal Processor, not shown), or a flash (e.g., LED or xenon lamp, not shown).

The power management module 1595 may manage electric power of the electronic device 200. Although not shown, the power management module 1595 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 1596 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1596 and a voltage, current or temperature in a charging process. The battery 1596 may store or create electric power therein and supply electric power to the electronic device 1501. The battery 1596 may be, for example, a rechargeable battery or a solar battery.

The indicator 1597 may show thereon a current status (e.g., a booting status, a message status, or a recharging status) of the electronic device 1501 or of its part (e.g., the AP 1510). The motor 1598 may convert an electric signal into a mechanical vibration. Although not shown, the electronic device 1501 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 16:
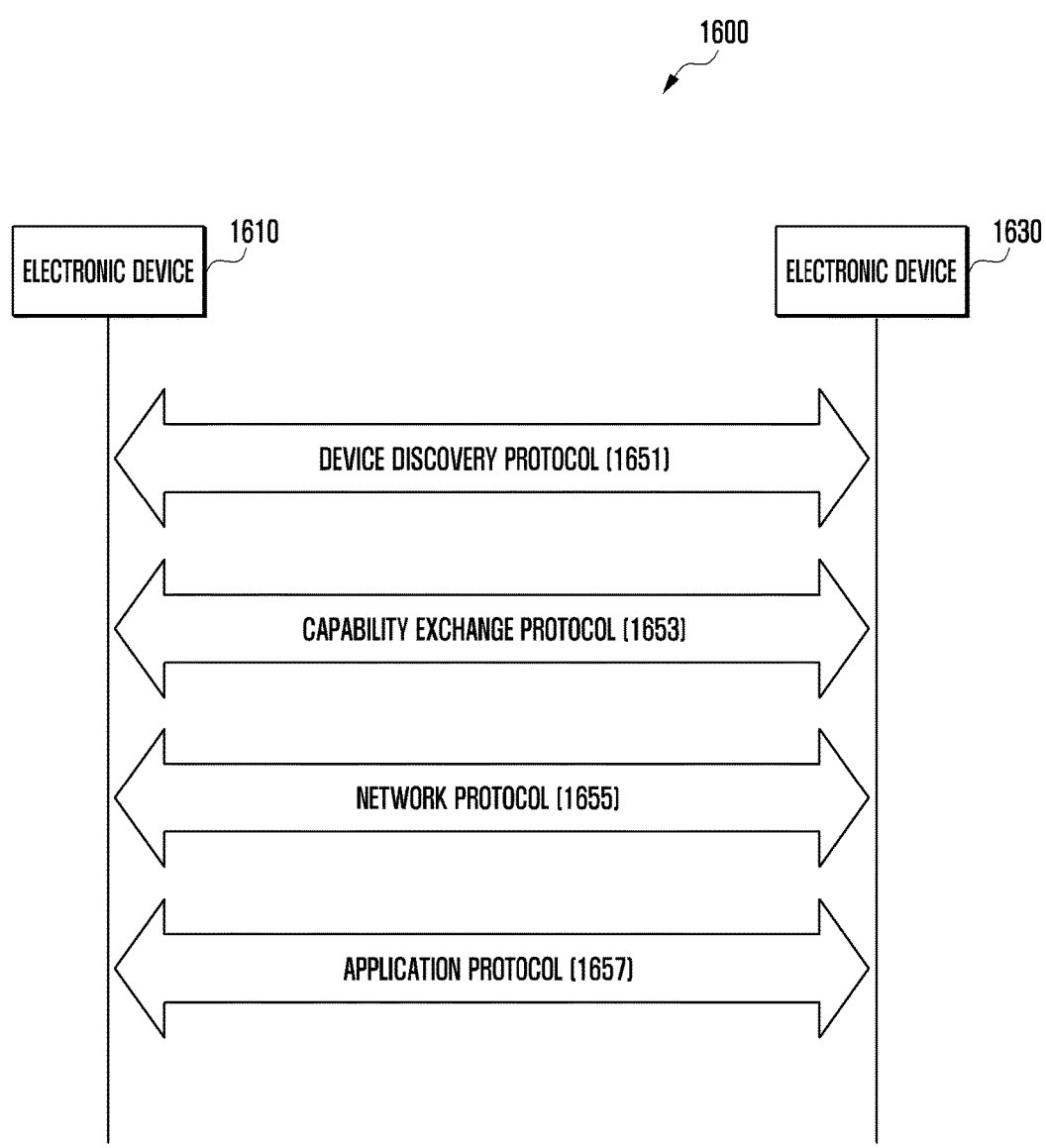
FIG. 16 is a diagram illustrating communication protocols operating between electronic devices according to various embodiments of the present disclosure.

FIG. 16 is a diagram illustrating communication protocols operating between electronic devices according to various embodiments of the present disclosure. Referring now to FIG. 16, the communication protocols 1600 include a device discovery protocol 1651, a capability exchange protocol 1653, a network protocol 1655, and an application protocol 1657.

According to an embodiment of the present disclosure, the device discovery protocol makes it possible for the electronic devices (e.g. devices 1610 and 1630) to discover each other and establish connections therebetween. For example, the electronic device 1610 (e.g. electronic device 101) may detect the electronic device 1630 (e.g. electronic device 104) through an available communication scheme (e.g. Wi-Fi, BT, and USB) using the device discovery protocol 1651. The electronic device 1610 may acquire identity information of the detected electronic device 1630 and stores the identity information with the device discovery protocol 1651 for use in establishing a communication link with the detected electronic device 1630. The electronic device 1610 may establish the communication link with the electronic device based on the identity information.

According to an embodiment, the device discovery protocol 1651 may be a protocol for mutual authentication between electronic devices. For example, the electronic device 1610 may perform mutual authentication with the electronic device 1630 based on the communication information for connection with the electronic device (e.g. Media Access Control (MAC) address, Universally Unique Identifier (UUID), Subsystem Identification (SSID), and Internet Protocol (IP) address.

According to an embodiment, the capability exchange protocol 1653 may be a protocol for exchange of service capabilities available for the electronic devices 1610 and 1630. For example, the electronic devices 1610 and 1630 may exchange the information on the services which they can provide using the capability exchange protocol 1650. The service capability information may include the identifiers of the services which the electronic devices 1610 and 1630 support. For example, the electronic device 1610 may receive an identifier of a specific service supported by the electronic device 1630 through the capability exchange protocol 1653. In this case, the electronic device 1610 determines whether it can support the service based on the received service identifier.

According to an embodiment, the network protocol 1655 may be a protocol for controlling data flows between the connected electronic devices (e.g. electronic devices 1610 and 1630) in association with the communication service. For example, at least one of the electronic devices 1610 and 1630 may perform error control or data quality control using the network protocol 1655. Additionally or alternatively, the network protocol 1655 may determine the transmission format of data exchanged between the electronic devices 1610 and 1630. At least one of the electronic devices 1610 and 1630 may control the session for data communication (e.g. session establishment and session release) using the network protocol 1655.

According to an embodiment, the application protocol 1657 may be a protocol for determining the procedure of exchanging data related to the service provided to outside electronic devices and information thereon. For example, the electronic device 1610 (e.g. electronic device 101) may provide the electronic device 1630 (e.g. electronic device 104 and server 106) with the service through the application protocol 1657.

According to an embodiment, the communication protocols 1600 may include at least one of standard communication protocols and communication protocols designated by a user or an organization (e.g. communication protocols designated by communication device manufacturer or network provider).

The term "module" used in this disclosure may refer to a certain unit that includes hardware, software and/or firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

According to various embodiments of the present disclosure, at least part of a device (e.g., modules or functions thereof) or a method (e.g., operations) according to the present disclosure be implemented, for example, by an instruction stored in a computer-readable storage media in a form of a programming module. When the instruction is executed by at least one processor (e.g., the processor 120), the at least one processor may perform a function corresponding to the instruction. The computer readable storage media may be, for example, the memory 130.

The computer-readable storage media may include Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as Read Only Memory (ROM), Random Access Memory (RAM), or flash memory for storing and executing program commands (e.g., a programming module). Further, the program command may include a machine language code created by a compiler and a high-level language code executable by a computer using an interpreter. The foregoing hardware device may be configured to be operated according to at least one software module to perform an operation of the present disclosure, or software modules may be configured to be operated according to the hardware device.

The programming module according to the present disclosure may include at least one of the aforementioned elements, or may omit a part of the aforementioned elements, or may further include additional different elements. The operations performed by the programming module according to the present disclosure or other elements may be executed by a sequential, a parallel, an iterative, or a heuristics method. In addition, some operations may be executed in a different order, or may be omitted, or may add other operations.

According to various embodiments of the present disclosure, the electronic device includes a storage unit for storing data segments constituting multimedia data, a controller for segmenting the multimedia data and transmitting data segments as a whole or selectively and receiving the data segments as a whole or selectively, and a communication unit for transmitting and receiving the data segments. The controller may control the transmission of data segments selectively in response to a selective data transmission request. In the case of transmitting at least part of the data segments, the controller selects data segments according to user's selection input or a predetermined rule and changes the resolution or size of at least part of the data segments to be transmitted. If it is determined that the size of each of the data segments is equal to or less than a predetermined size or the number of data segments is equal to or greater than a predetermined value, the control unit may combine parts of the data segments. The controller may determine whether an additional information request is detected. The additional information request may be input in the form of a pinch-to-zoom or proximity input detectable by an input unit, and the controller controls to receive preview images corresponding to the data segments in response to the pinch-to-zoom gesture and displays the received preview images. The controller may control to display the preview animations of the data segments selected in response to the proximity input, and at least one of the number of preview animations and animation speed may vary depending on at least one of the proximity input strength or distance. If the selection input is made to one of the preview images corresponding to the data segments constituting the multimedia data, the controller controls to receive the data segment corresponding to the selected preview image and, otherwise if the selection input is made to the center of the preview images, the controller controls to receive all of the data segments of the multimedia data.

According to various embodiments, a storage medium stores commands executable by at least one processor which is capable of executing the command to perform at least one of operations of detecting a multimedia data transmission request, segmenting the multimedia data according to a predetermined condition in response to the multimedia data transmission request, and transmitting the data segments as a whole or selectively.

Various embodiments of the present disclosure are advantageous in terms of managing data transmission efficiently in such a way of uploading and downloading media data as segmented.

Also, various embodiments of the present disclosure are advantageous in terms of transmitting part of whole data selectively by segmenting the data.

Also, the various embodiments of the present disclosure are advantageous in terms of allowing a user to check the content of media data easily by providing preview images or Graphics Interchange Format (GIF) images of the segmented parts of media data.

That is, various embodiments of the present disclosure are advantageous in terms of reducing unnecessary waste of communication costs and time in transmitting/receiving (including uploading and downloading) multimedia files.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. In the present disclosure, for example, a input unit, display unit, wireless communication unit constitute hardware.

Although the present disclosure has been described with one or more embodiments for illustrative purposes, various changes and modifications may be made by one skilled in the art. It is intended that the present disclosure encompass such changes and modifications as fall within the scope of the appended claims.

What is claimed is:

1. A method by an electronic device comprising:
   displaying, on a display of the electronic device, a first preview image associated with a first data segment of a single continuous video, wherein the single continuous video comprises a plurality of data segments and each data segment is associated with one or more preview images, wherein the each data segment is video data corresponding to part of the single continuous video;
   in response to detecting a first user input on the first preview image, displaying a plurality of second preview images associated with a plurality of second data segments of the single continuous video;
   detecting a second user input selecting one of the plurality of second preview images; and
   in response to detecting the second user input, transmitting a request to selectively receive one of the plurality of second data segments corresponding to the selected one of the plurality of second preview images.

2. The method of claim 1, further comprising in response to detecting a third user input, displaying a plurality of third preview images associated with a plurality of third data segments of the single continuous video.

3. The method of claim 1, wherein the first user input is a pinch-to-zoom gesture on the first preview image.

4. The method of claim 1, further comprising in response to detecting a proximity input on the first preview image, sequentially displaying a first plurality of additional preview images associated with the first data segment in place of the first preview image.

5. The method according to claim 4, wherein:
when the proximity input is at a first distance from the display, the first plurality of additional preview images includes a first number of additional preview images; and
when the proximity input is at a second distance from the display, the first plurality of additional preview images includes a second number of additional preview images, wherein the second distance is shorter than the first distance, and the second number is greater than the first number.

6. The method of claim 4, further comprising, when the proximity input corresponds to a center of the first preview image, displaying a second plurality of additional preview images associated with the plurality of data segments.

7. The method of claim 1, wherein, based on a property of the electronic device, a resolution of the first data segment or the second data segment is reduced.

8. The method of claim 1, further comprising:
displaying an object indicating existence of additional data segments not currently displayed; and
receiving, when the object is selected, the additional data segments.

9. The method of claim 1, further comprising, when the first data segment and the one of the plurality of second data segments are received and when a first size of the first data segment or a second size of the one of the plurality of second data segments is below a predetermined minimum segment size, combining the first data segment and the one of the plurality of second data segments.

10. An electronic device comprising:
a display;
a storage component comprising a non-transitory memory; and
a controller configured to:
display, on the display, a first preview image associated with a first data segment of a single continuous video, wherein the single continuous video comprises a plurality of data segments and each data segment is associated with one or more preview images, wherein the each data segment is video data corresponding to part of the single continuous video;
in response to a first user input on the first preview image, display a plurality of second preview images associated with a plurality of second data segments of the single continuous video;
detect a second user input selecting one of the plurality of first preview image and/or the second preview images;
in response to the second user input, transmit a request to selectively receive one of the plurality of second data segments corresponding to the selected one of the plurality of second preview images; and
control the storage component to store the received one of the plurality of second data segments.

11. The electronic device of claim 10, wherein the controller is further configured to, in response to a third user input, display a plurality of third preview images associated with a plurality of third data segments of the single continuous video.

12. The electronic device of claim 10, wherein the first user input is a pinch-to-zoom gesture on the first preview image.

13. The electronic device of claim 12, wherein the controller is further configured to, in response to a proximity input on the first preview image, sequentially display a first plurality of additional preview images associated with the first data segment in place of the first preview image.

14. The electronic device of claim 13, wherein:
when the proximity input is at a first distance from the display, the first plurality of additional preview images includes a first number of additional preview images; and
when the proximity input is at a second distance from the display, the first plurality of additional preview images includes a second number of additional preview images, wherein the second distance is shorter than the first distance, and the second number is greater than the first number.

15. The electronic device of claim 13, wherein the controller is further configured to, when the proximity input corresponds to a center of the first preview image, displaying a second plurality of additional preview images associated with the plurality of data segments.

16. The electronic device of claim 10, wherein, based on a property of the electronic device, a resolution of the first data segment or the second data segment is reduced.

17. The electronic device of claim 10, wherein the controller is further configured to:
display an object indicating existence of additional data segments not currently displayed; and
receive, when the object is selected, the additional data segments.

18. The electronic device of claim 10, wherein the controller is further configured to, when the first data segment and the one of the plurality of second data segments are received and when a first size of the first data segment or a second size of the one of the plurality of second data segments is below a predetermined minimum segment size, combining the first data segment and the one of the plurality of second data segments.

* * * * *